United States Patent [19]
Noel

[11] Patent Number: 4,952,450
[45] Date of Patent: * Aug. 28, 1990

[54] FOAM PANEL AND BLOCK CONSTRUCTIONS

[75] Inventor: Gert Noel, Hauset, Belgium

[73] Assignee: Noel, Marquet & Cie. S.A., Eupen, Fed. Rep. of Germany

[*] Notice: The portion of the term of this patent subsequent to Jul. 5, 2005 has been disclaimed.

[21] Appl. No.: 195,945

[22] Filed: May 19, 1988

Related U.S. Application Data

[63] Continuation-in-part of Ser. No. 931,236, Nov. 17, 1986, Pat. No. 4,755,408.

[51] Int. Cl.$^5$ .......................... E04C 1/08; E04C 2/44; B32B 3/20
[52] U.S. Cl. ............................. 428/174; 428/178; 428/179; 428/182; 428/184; 428/188; 428/189; 428/316.6
[58] Field of Search ............... 428/174, 178, 179, 182, 428/184, 188, 189, 316.6

[56] References Cited

U.S. PATENT DOCUMENTS 4,753,841 6/1988 Noel et al. .......................... 428/188
4,755,408 7/1988 Noel ................................. 428/316.6

Primary Examiner—William J. Van Balen
Attorney, Agent, or Firm—Mattern, Ware, Stoltz & Fressola

[57] ABSTRACT

By providing a plurality of elongated, independent members and securely integrally affixing said members to each other by adhering or welding, a unique panel and/or block construction is attained having any desired size or shape needed for a particular application. Preferably, the independent, elongated members comprise a synthetic resin foam material formed in any desired cross-sectional shape. In one embodiment, the solid elongated, independent members are alternatingly affixed to hollow, elongated independent members in order to attain a panel and/or block having different resiliency and flexibility characteristics. This invention also incorporates a unique method for manufacturing the panels and/or blocks in a single, continuous process whereby all of the elongated members forming the panel and/or block are simultaneously welded together.

13 Claims, 28 Drawing Sheets

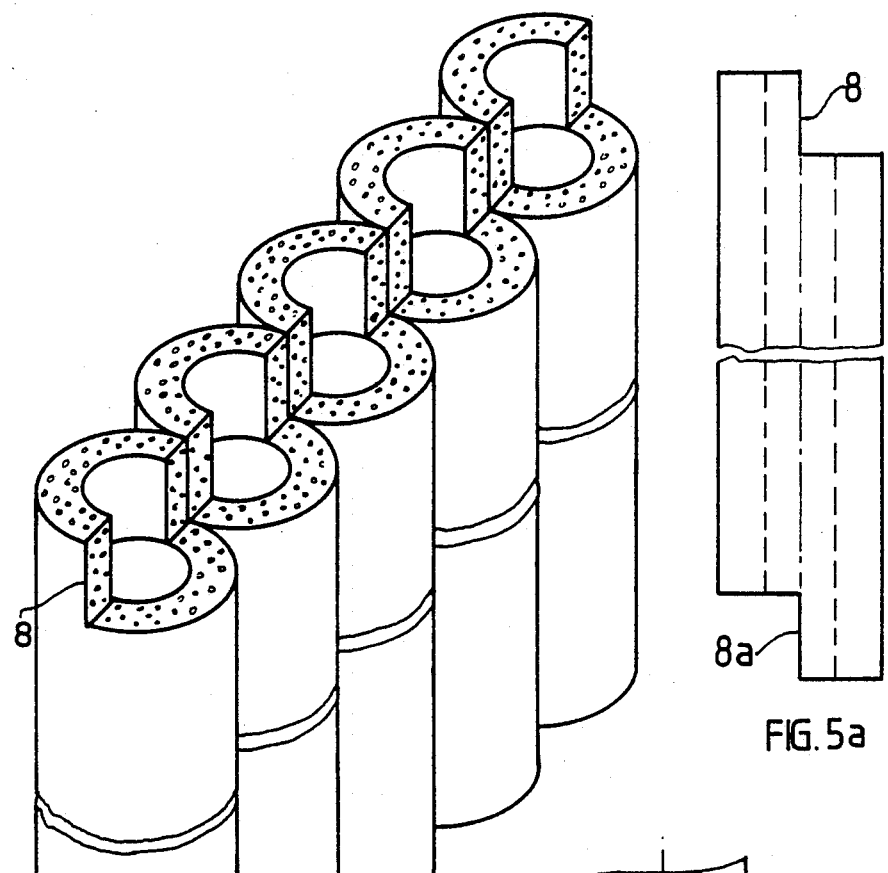
FIG. 5a
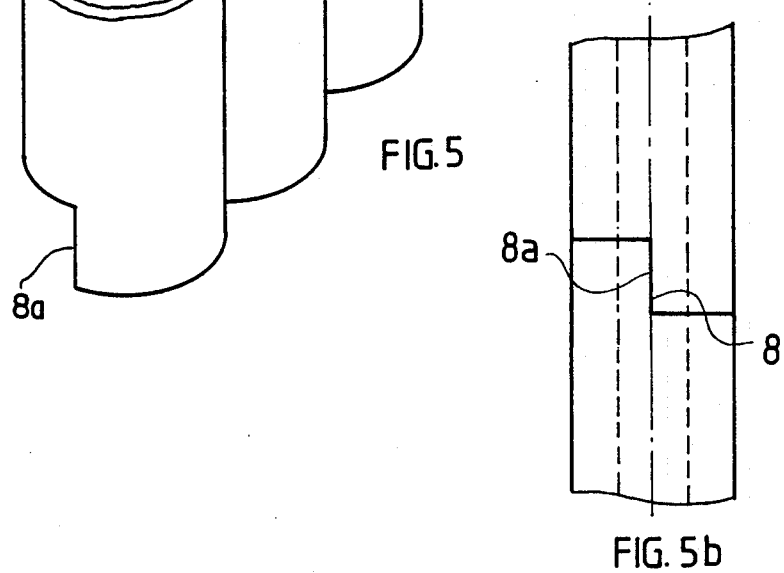
FIG. 5
FIG. 5b

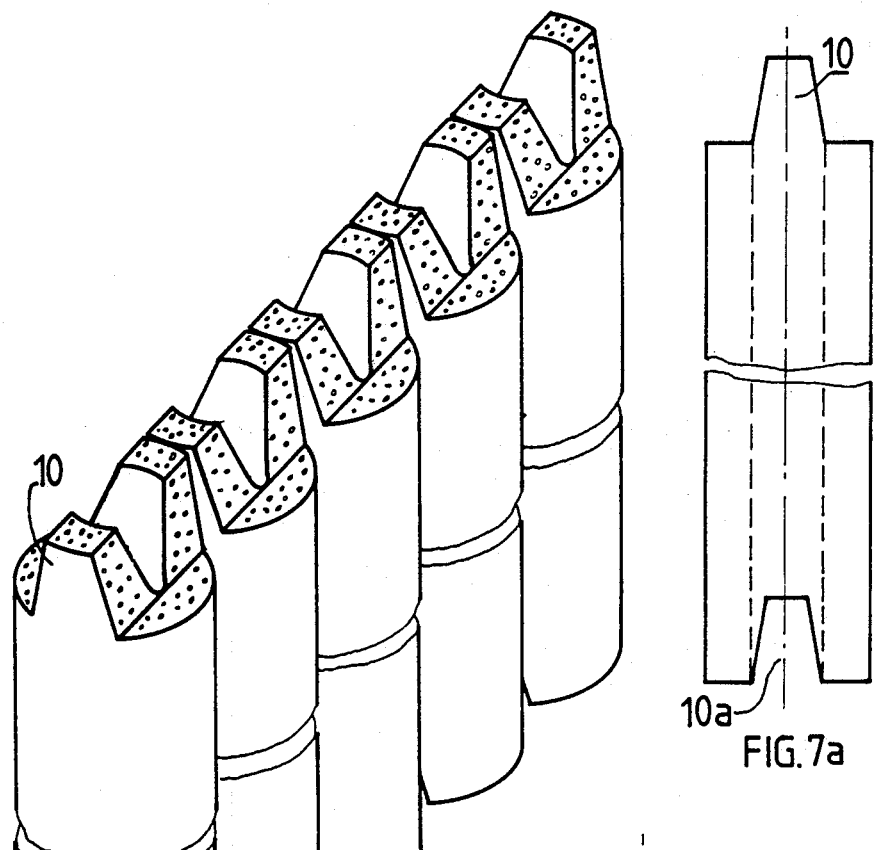
FIG. 7a
FIG. 7
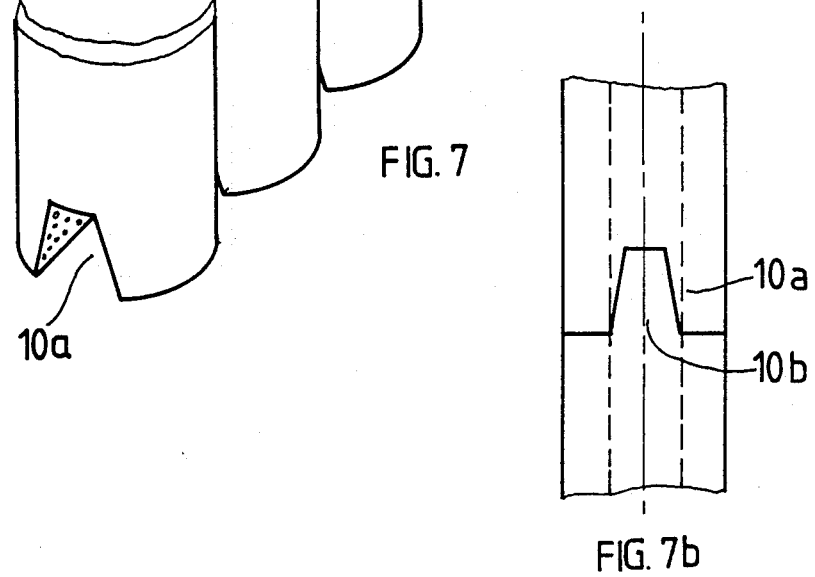
FIG. 7b

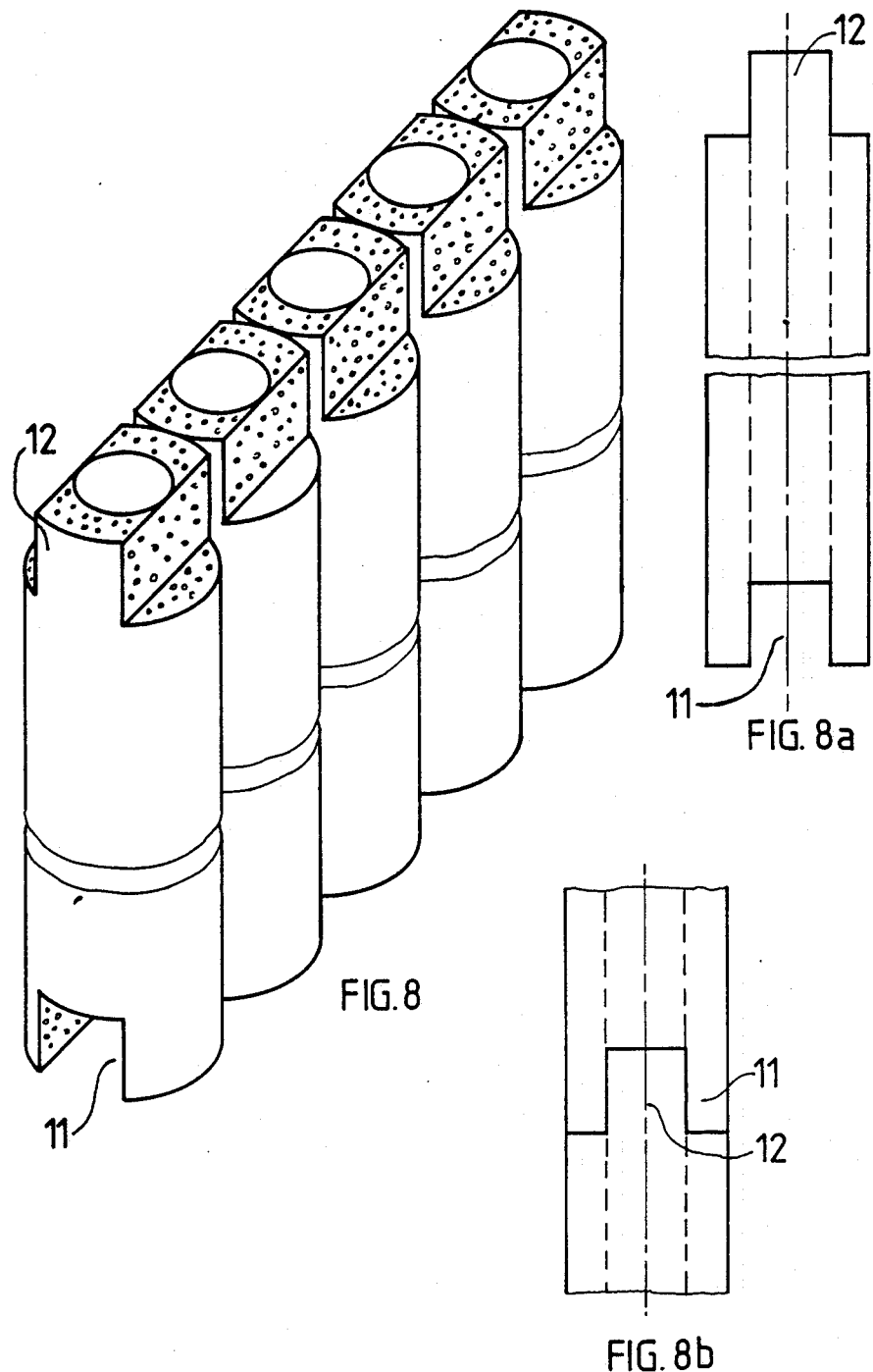

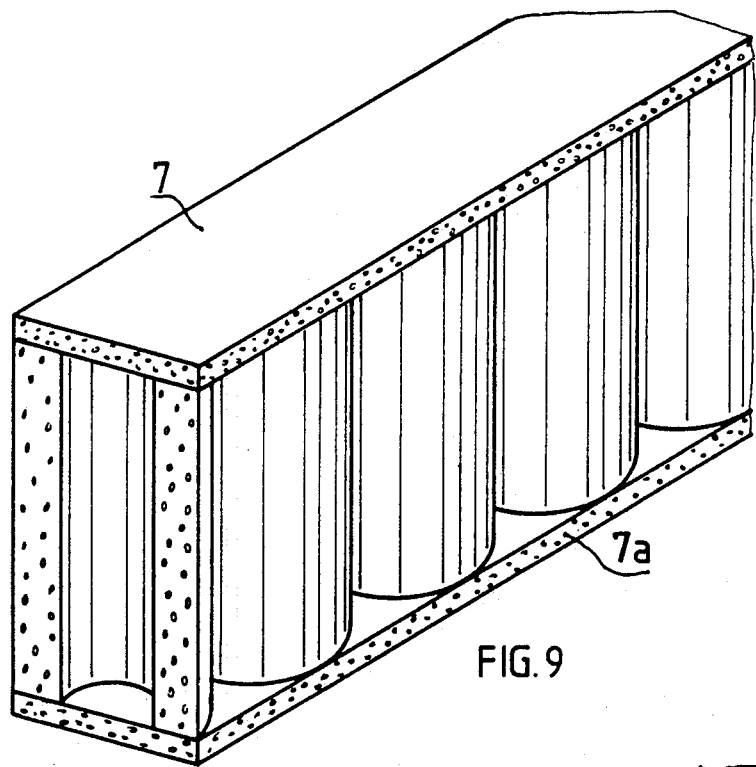
FIG. 9
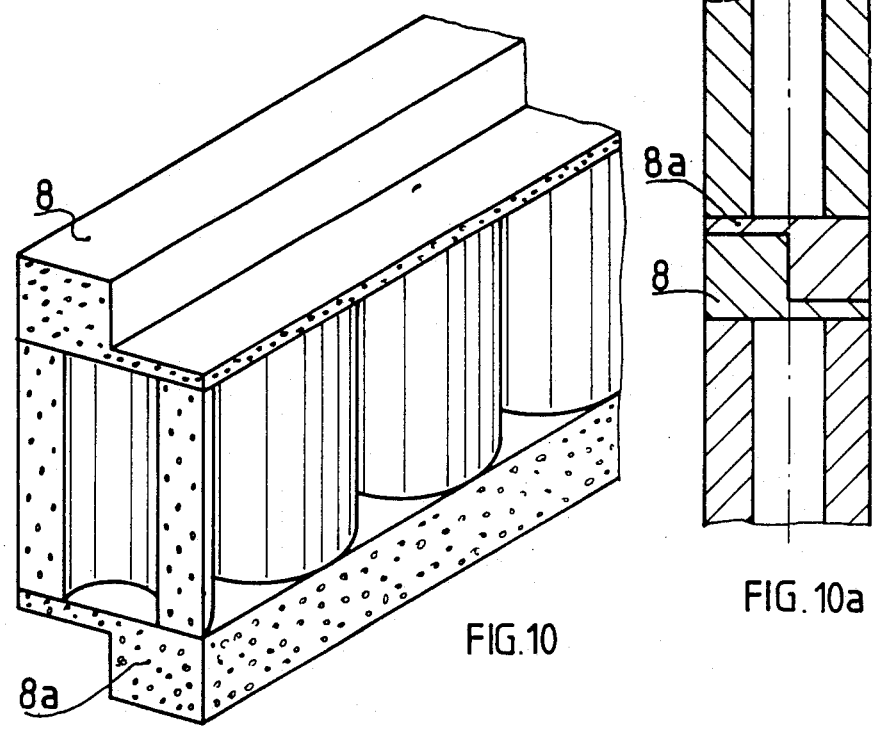
FIG. 10
FIG. 10a

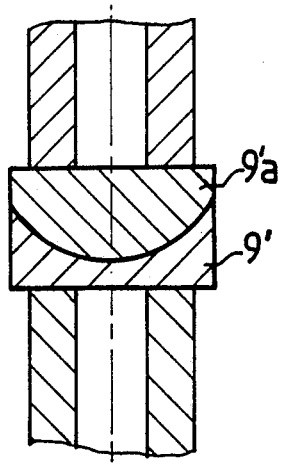
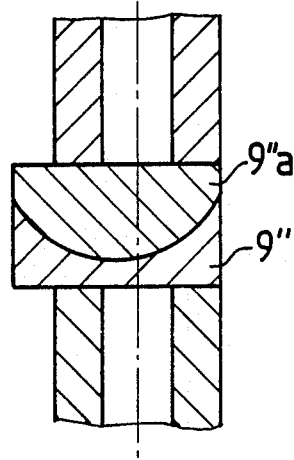
FIG.38  FIG.39
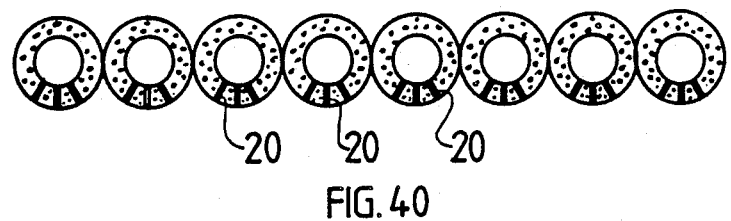
FIG.40
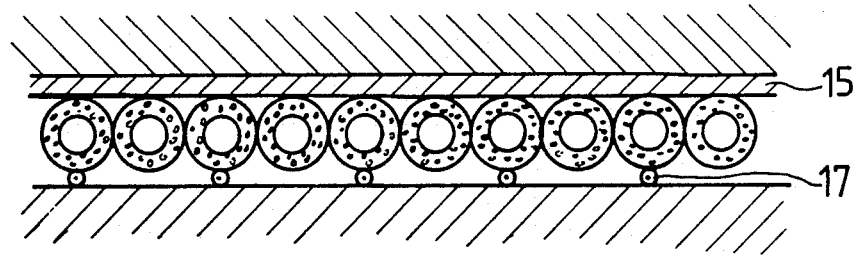
FIG.41

FOAM PANEL AND BLOCK CONSTRUCTIONS

This application is a continuation-in-part application of Ser. No. 931,236, filed Nov. 17, 1986 now U.S. Pat. No. 4,755,408.

FIELD OF THE INVENTION

The present invention relates to foam panels and/or blocks of synthetic resin material, and more particularly to foam panels and/or blocks constructed from a plurality of elongated members secured affixed to each other.

BACKGROUND ART

Foam panels or blocks made of synthetic resin materials have long been known and employed for a wide range of end uses. Typically such panels or blocks range from rigid to highly elastic and may consist of a wide variety of materials. In addition, their volume weights may vary widely, ranging from a high of about 600 kilograms per cubic meter to a relatively low volume weight of 30 kilograms per cubic meter.

Since many end uses of such products are for thermal insulations, foam materials are often employed for such panels or blocks. Such foam materials are very light weight and typically have closed cell structure of very fine cells, whenever possible. Examples of such foam materials are polyurethane foams or polystyrene foams, as well as foams produced from polyolefins and polyethylenes.

In addition to use of such materials for thermal insulation purposes, a variety of other uses has been found for these materials. However, due to manufacturing problems enunciated in the continuous construction of very light weight foam panels or blocks, such uses have heretofore been limited or result in products which are extremely expensive. Typically, the continuous manufacture of very light weight foam panels or blocks is relatively complicated and is capable of producing panels or blocks up to a certain minimum volume weight. As a result, a wide variety of alternate uses and product constructions have heretofore been incapable of being competitively constructed, due to the inability of the industry to produce foam panels or blocks of the requisite size and shape in a manner which would be competitive.

Therefore, it is a principal object of the present invention to provide foam panels and/or blocks which can be manufactured relatively easily and which have very low volume weights based upon the total volume thereof.

Another object of the present invention is to provide foam panels and/or blocks having the characteristic features described above which are capable of being manufactured with virtually any length and/or width, depending upon the desired use thereof, as well as being capable of being manufactured in single or multiple layers.

Another object of the present invention is to provide foam panels and/or blocks having the characteristic features described above which also incorporate a plurality of elongated members affixed to each other comprising both similar and dissimilar cross-sectional configurations.

Other and more specific objects will in part be obvious and will in part appear hereinafter.

SUMMARY OF THE INVENTION

The present invention overcomes the prior art drawbacks and inabilities by providing foam panels or blocks of any desired size and shape by securely affixing a plurality of elongated, independent members to each other in a manner to form the desired configuration. Preferably, the elongated members comprise either hollow to solid cross-sectional profiles, or a combination thereof, with each of the elongated members being adhered and/or welded to each other in order to attain the desired configuration for the panel or block.

In addition, if desired, the plurality of elongated members all comprise similar overall configurations, such as squares, rectangles, ovals, or circles, with either homogeneous or heterogeneous combinations of hollow and solid cross-sections. In addition, if desired, the elongated members may comprise a plurality of different shapes, each of which are affixed to each other in a desired arrangement in order to attain the panel or block configuration being sought.

In the preferred construction, the elongated members are formed of foam material, as detailed above, and have a volume weight of less than 20 kilograms per meter cubed. In addition, the resulting foam panels and/or blocks constructed in accordance with the present invention are produced by either gluing or welding the plurality of elongated members to each other. If welding is desired, either solution welding or thermal welding can be employed. However, thermal welding is preferred for attaining the most desirable economic production of foam panels and/or blocks attainable using the present invention.

The invention accordingly comprises an article of manufacture and process for making the article possessing the features, properties and the relation of elements and steps which will be exemplified in the articles and processes hereinafter described and the scope of the invention will be indicated in the claims.

THE DRAWINGS

For a fuller understanding of the nature and objects of the invention, reference should be had to the following detailed description taken in connection with the accompanying drawings in which:

FIG. 5 is a perspective view of a foam panel according to FIG. 1 where the panel edges formed by the tube ends have a stepped profile 8, 8a cut out of the tube ends.

FIG. 5a is a plan view of the panel edge 6 formed by the tube wall of the first tube in the foam panel.

FIG. 5b is a plan view of the stepped edge 8, 8a as formed when two matching foam panels according to FIG. 5 are put together.

FIG. 7 is a perspective view of a foam panel according to FIG. 1 where the panel edges formed by the tube ends have the shape of a wedge 10, 10a out out of the tube ends.

FIG. 7a is a plan view of the panel edge 6 formed by the tube wall of the first tube in the foam panel.

FIG. 7b is a plan view of the wedge 10, 10a formed when two matching foam panels according to FIG. 7 are put together.

FIG. 8 is a perspective view of a foam panel according to FIG. 1 in which the panel edges formed by the tube ends have a groove 11 and a tongue 12, respectively, cut out of the tube ends.

FIG. 8a is a plan view of the panel edge 6 formed by the tube wall of the first tube in the foam panel.

FIG. 8b is a plan view of the groove-and-tongue joint 11, 12 formed when two matching foam panels according to FIG. 8 are put together.

FIG. 9 is a schematic perspective view of a foam panel according to FIG. 1 whose open tube ends are provided on both sides with a foam strip 7, 7a. In the foreground of the figure the foam panel is cut through along the longitudinal axis of a tube in order to demonstrate the position of the weld.

Figure 1:
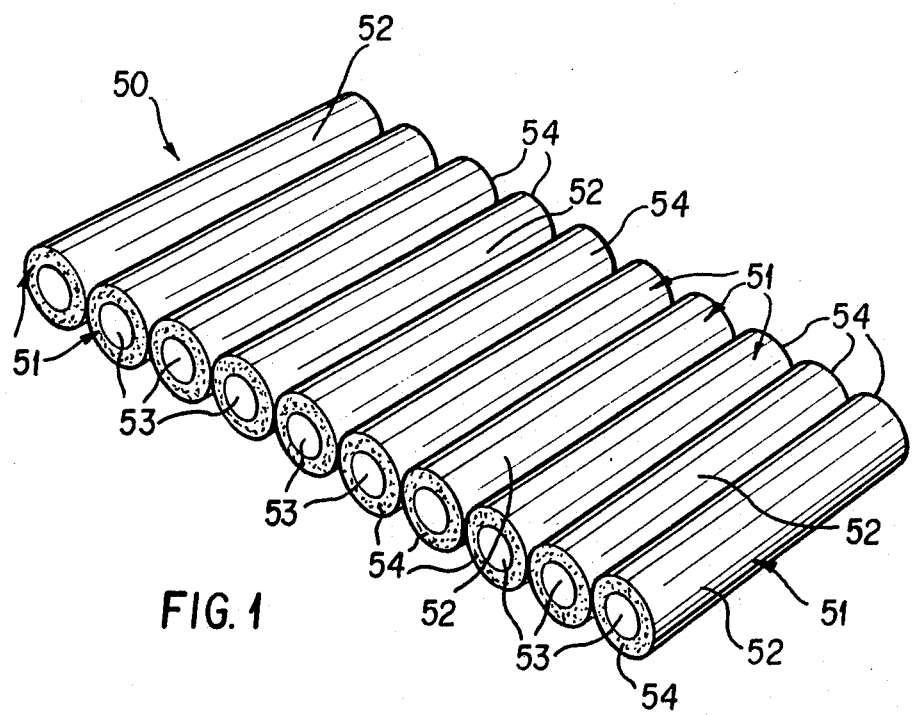
FIG. 1, 1a and 1b are perspective views of alternate embodiments of foam panels having a substantially rectangular shape and consisting of a single layer of foam members welded together in a side by side, substantially parallel configuration.

FIG. 10 is a schematic perspective view of a foam panel according to FIG. 1 whose open tube ends are provided on both sides with a stepped edge profile bar of synthetic resin foam, preferably the same foam from which the tubes are made. When two matching foam panels are put together they form a step joint. In the foreground the foam panel is cut through along the longitudinal axis of a tube in order to demonstrate the position of the profile bars.

FIG. 10a is a cross-section through a stepped profile joint.

Figure 11:
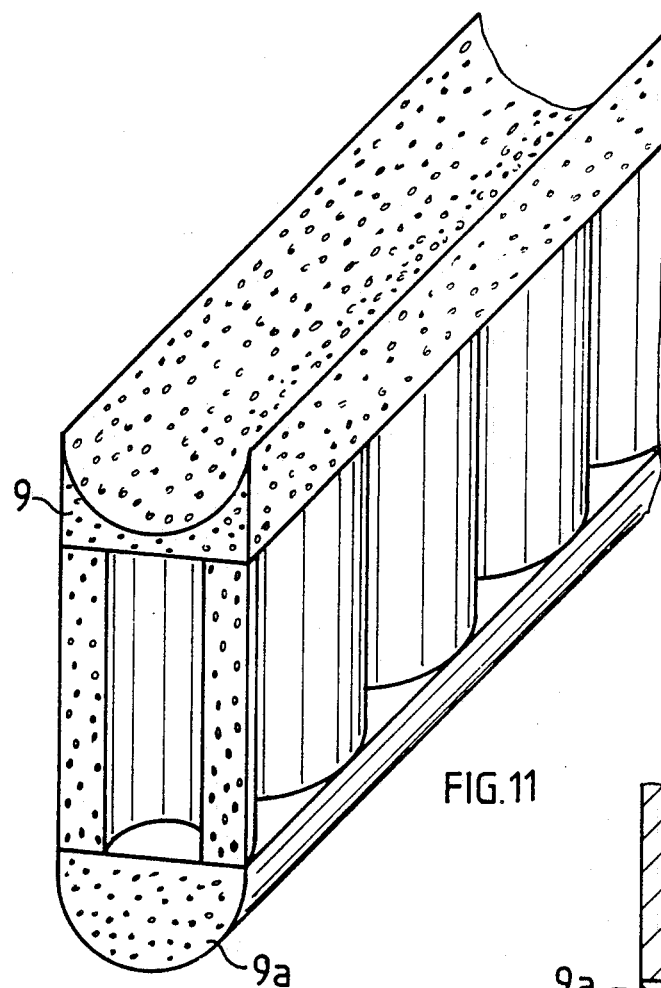

FIG. 11 is a schematic perspective view of a foam panel according to FIG. 1 whose open tube ends are provided on both sides with a round edge profile bar of synthetic resin foam welded thereto, preferably the same synthetic resin foam as the tube material. When two matching foam panels are put together they form a round edge joint. In the foreground the foam panel is cut through along the longitudinal axis of a tube in order to demonstrate the position of the profile bars.

Figure 11A:
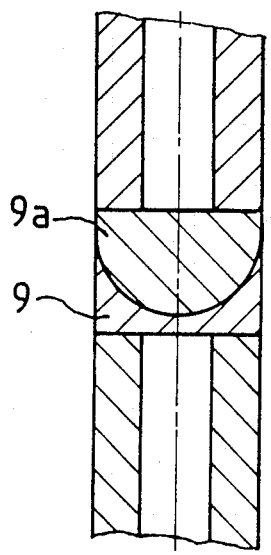

FIG. 11a is a cross-section through a round edge joint.

Figure 12:
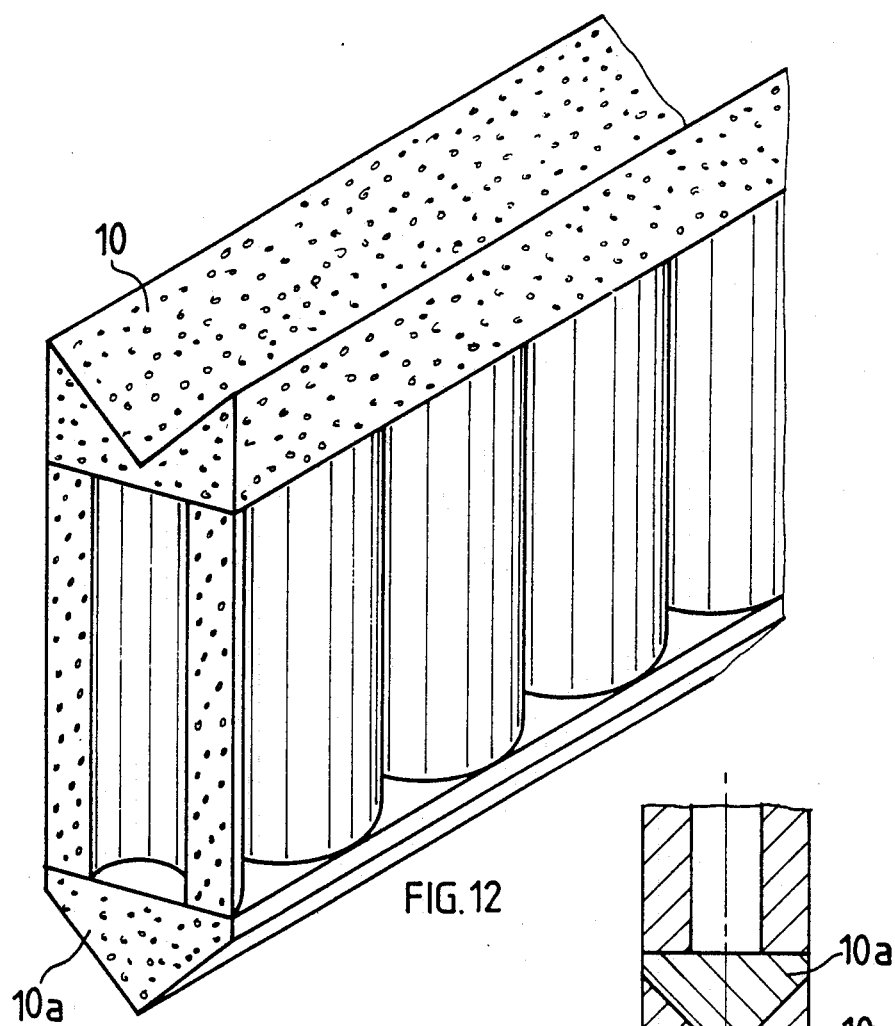

FIG. 12 is a schematic perspective view of a foam panel according to FIG. 1 whose open tube ends are provided on both sides with a wedge edge profile bar of synthetic resin foam welded thereto, preferably the same synthetic resin foam as the tube material. Two matching foam panels put together form a wedge joint. In the foreground the foam panel is cut along the longitudinal axis of a tube in order to demonstrate the position of the profile bars.

Figure 12A:
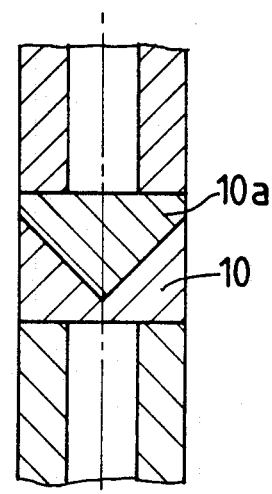

FIG. 12a is a cross-section through a wedge joint. In this manner a grooved profile bar can be welded or adhered to one edge and a tongue profile bar, or tongue profile bars of different configuration, can be welded or adhered to the other edge.

Figure 13:
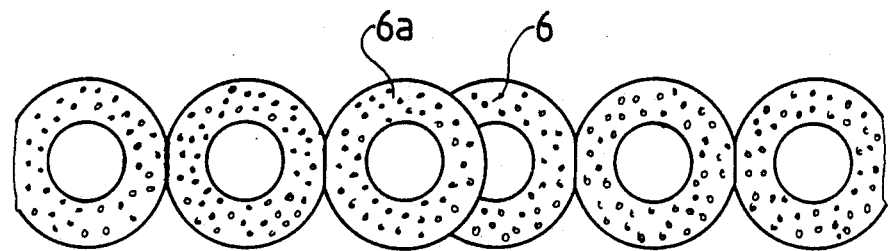

FIG. 13 is a section through a panel joint of the round edge type which extends along the panel edges formed by the tube walls 6, 6a, in which the panel edge formed by the tube wall 6a of one tube panel is unchanged, while the panel edge formed by the tube wall 6 of the other tube panel is cut out in a circular arc along the length axis of the tube.

Figure 14:
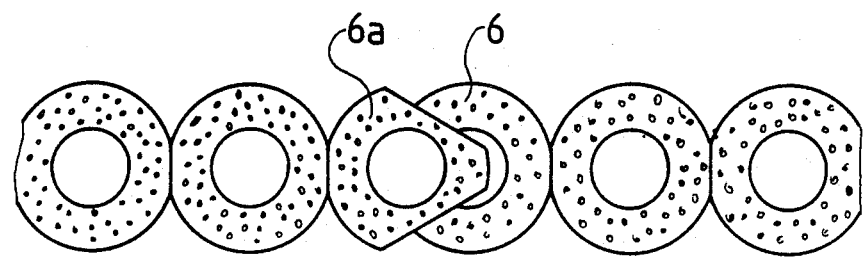

FIG. 14 is a cross-section through a panel joint of the wedge edge type which extends along the panel edges formed by the tube walls 6, 6a. One panel edge formed by the tube wall 6 of the one tube panel is cut out in segment form along its longitudinal axis, and the other panel edge formed by the tube wall 6a of the other tube panel is cut out in wedge form so that it extends and fits into the segment-shaped cut in the tube of the other tube panel. The interior cavity of the tube 6a cut to wedge shape is preferably filled with a foam rod, especially a rod of a material more rigid than the tube material.

Figure 15:
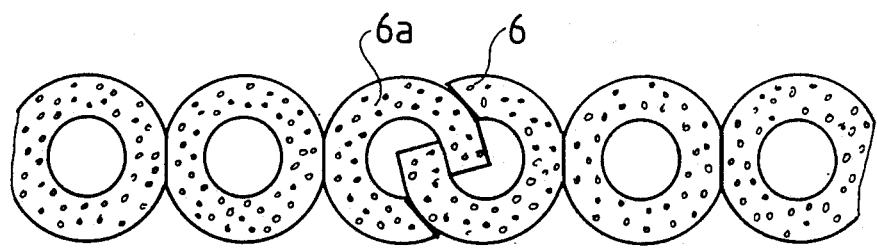

FIG. 15 is a cross-section through a panel joint in which both panel edges formed by tube walls 6, 6a are cut out in segment form along the longitudinal axes so that two matching panels can be hooked together, i.e. the segment-formed gaps are disposed laterally opposite each other, and the size of the segment gaps is equal to or somewhat smaller than the thickness of the tube wall.

Figure 3:
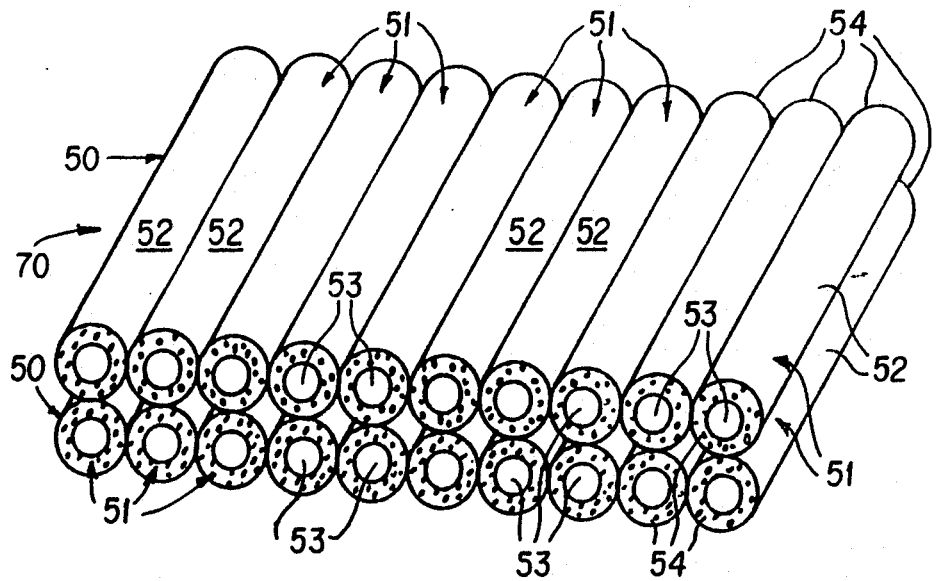
FIGS. 3, 3a and 3b are perspective views of alternate embodiments of foam blocks incorporating the teaching of the present invention and consisting of two panels of foam members welded together.
Figures 16, 16A:
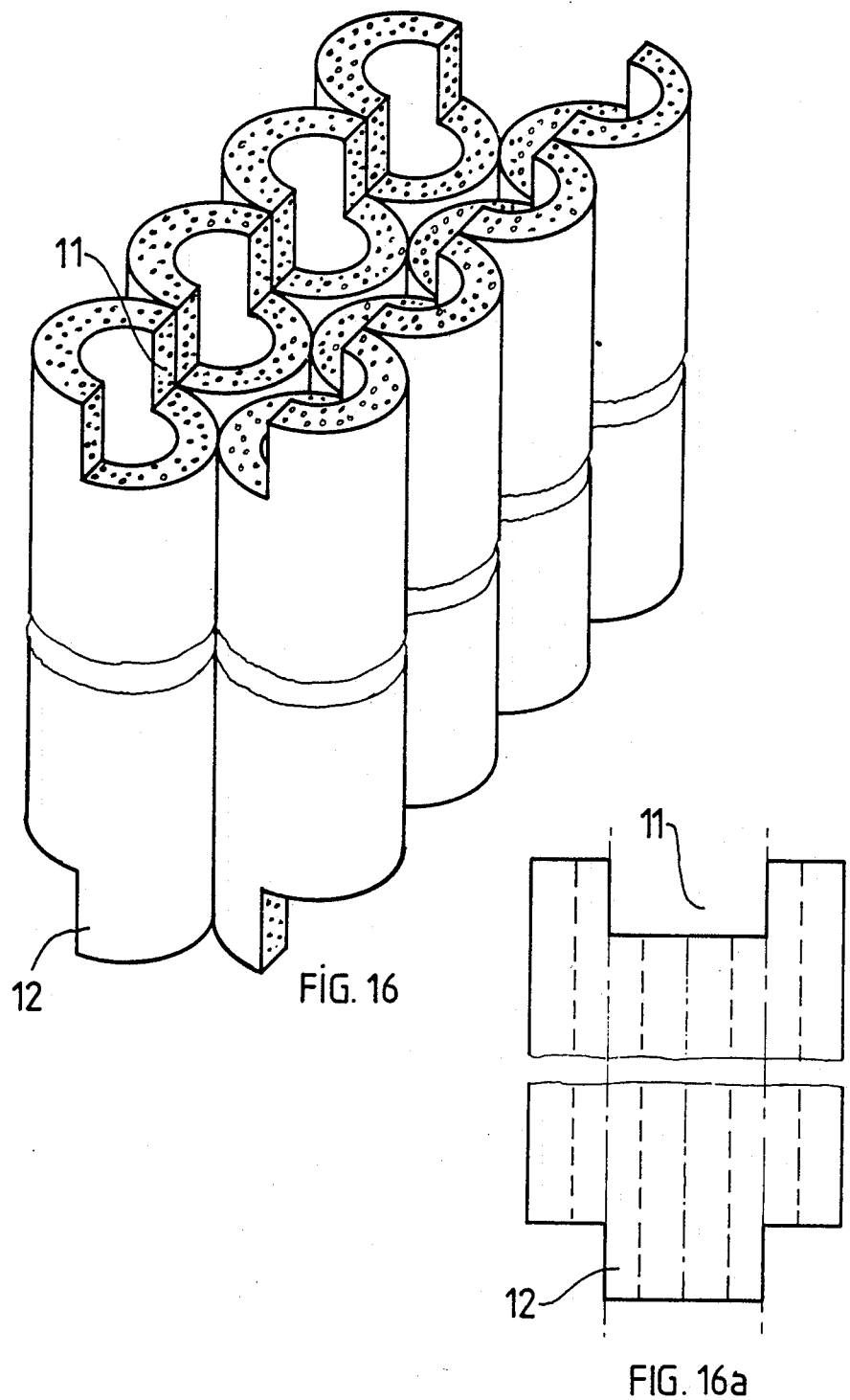

FIG. 16 is a perspective view of a foam panel composed of two tube panels according to FIG. 3 in which the panel edges formed by the tube ends show a groove 11 and tongue 12, respectively, cut out of the tube ends.

FIG. 16a is a plan view of the tube edge formed by the two tube walls of the first two tubes in the foam panel.

Figure 17:
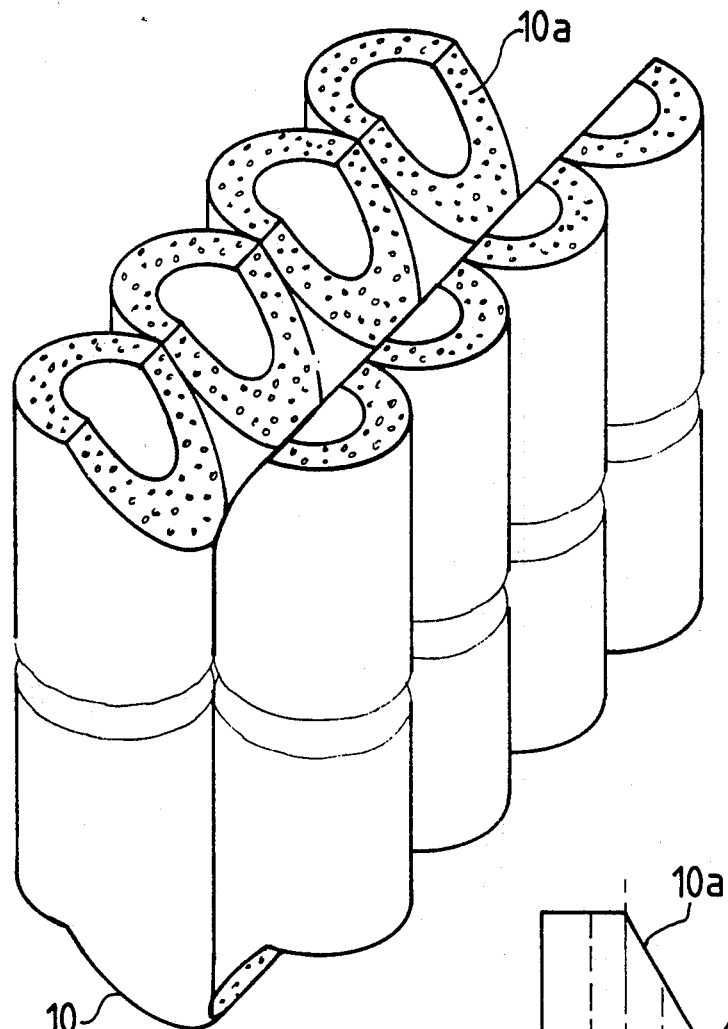

FIG. 17 is a perspective view of a foam panel composed of two tube panels according to FIG. 3 in which the panel edges formed by the tube ends have a wedge-shaped edge 10, 10a cut out of the tube ends.

Figure 17A:
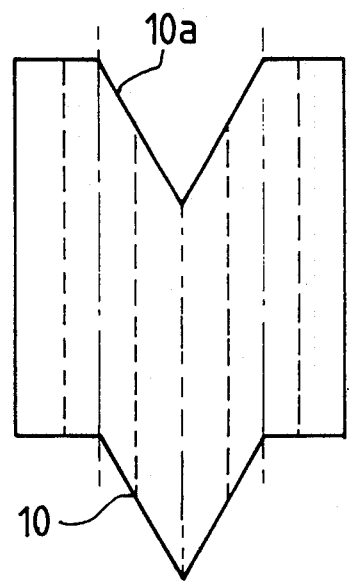

FIG. 17a is a plan view of the tube edge formed by the two tube walls of the first two tubes in the foam panel.

Figure 18:
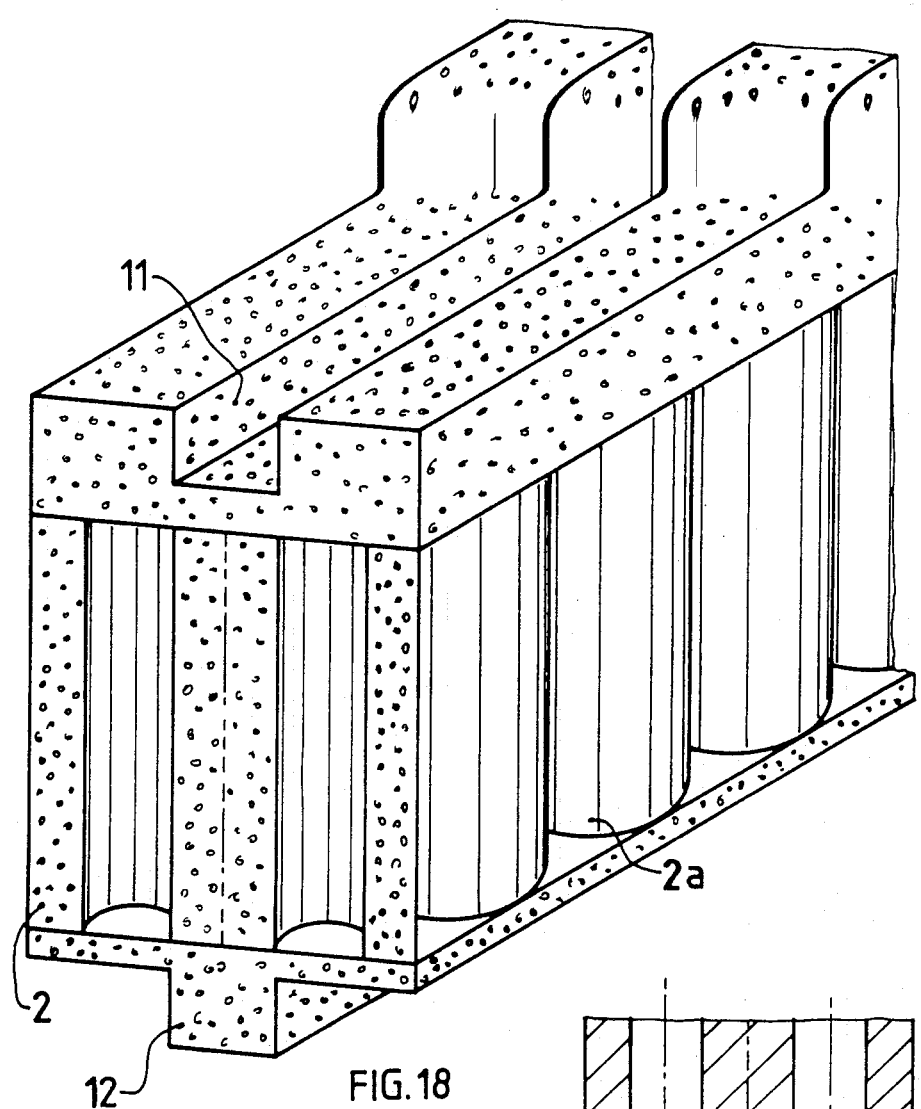

FIG. 18 is a perspective view of a foam panel composed of two tube panels according to FIG. 3 in which the panel edges formed by the tube ends have a groove (11) and a tongue (12) profile bar of synthetic resin foam welded thereto, preferably of the same foam material as the tube material. In the foreground the foam panel is cut along the longitudinal axis of the illustrated tube in order to demonstrate the position of the profile bars.

Figure 18A:
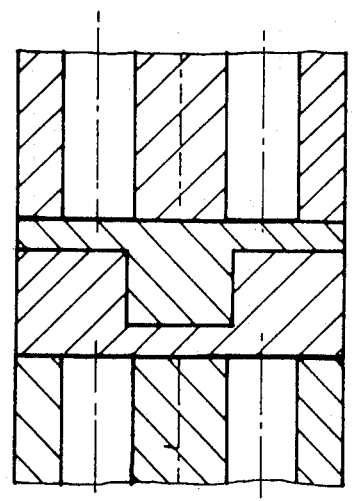

FIG. 18a is a section through a groove-and-tongue joint formed by two matching foam panels of FIG. 18.

Figure 19:
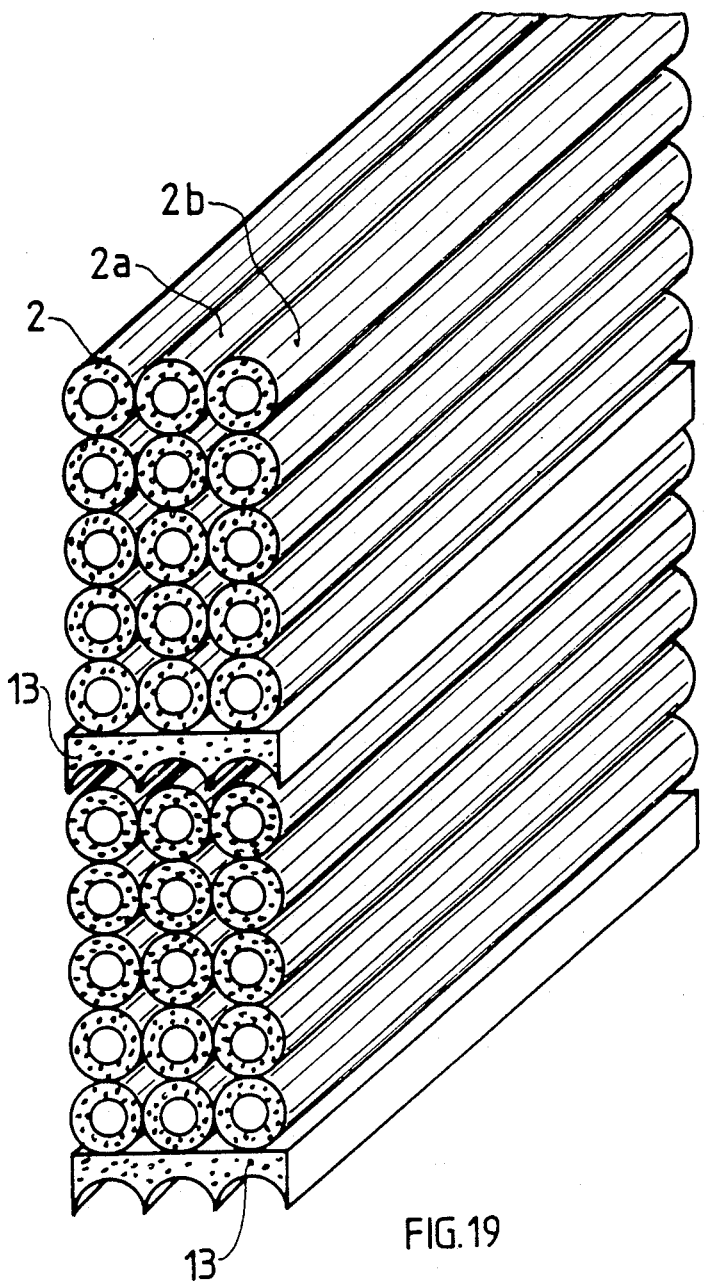

FIG. 19 is a perspective view of two foam panels joined the one to the other and composed each of three tube panels 2, 2a and 2b welded together, one panel edge being provided with a triple round edge profile bar 13, which together with the three end tubes of the matching other panel edge forms a triple round edge joint. The crosswise edges formed by the tube ends, if desired, can have the above described edge configurations or can form similar types of joints, either by direct cutting or by provision of matching profile bars.

Figure 20:
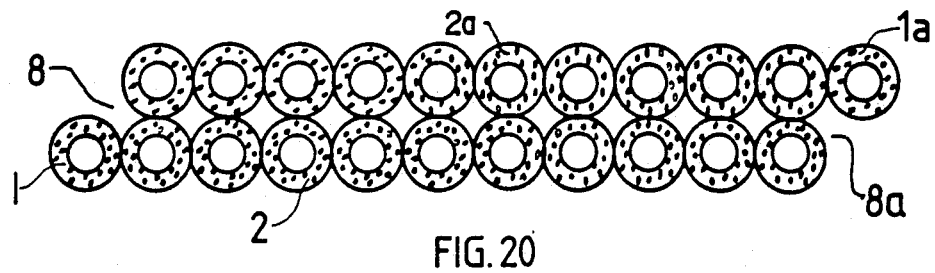

FIG. 20 is a cross-section through a foam panel consisting of two superposed tube panels 2, 2a in which the conditions for a stepped edge 8, 8a are provided by welding an additional tube 1 to the left-hand side below and a tube 1a to the right-hand side above.

Figure 21:
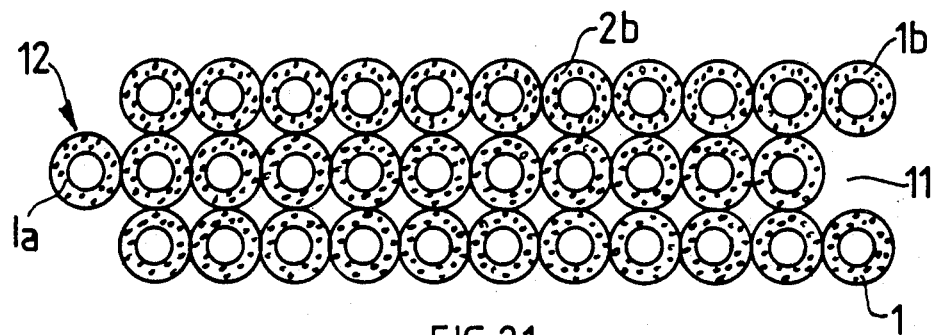

FIG. 21 is a cross-section through a foam panel composed of three superposed tube panels 2, 2a and 2b in which a groove 11 and a tongue 12 are formed by welding additional tubes 1, 1a, 1b thereto.

Figure 22:
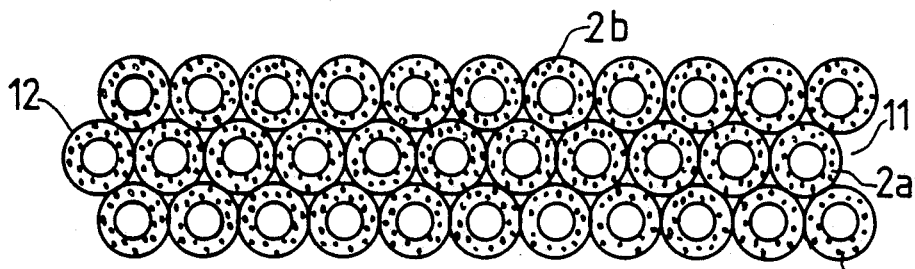

FIG. 22 shows a foam panel like that illustrated in FIG. 21 in which the central tube panel is so arranged that the longitudinal axes of the associated tubes are each disposed in the vertical plane extending through the weld seams above and below. In this case, too, a groove 11 is formed on one side and a tongue 12 is formed on the other side.

Figure 2:
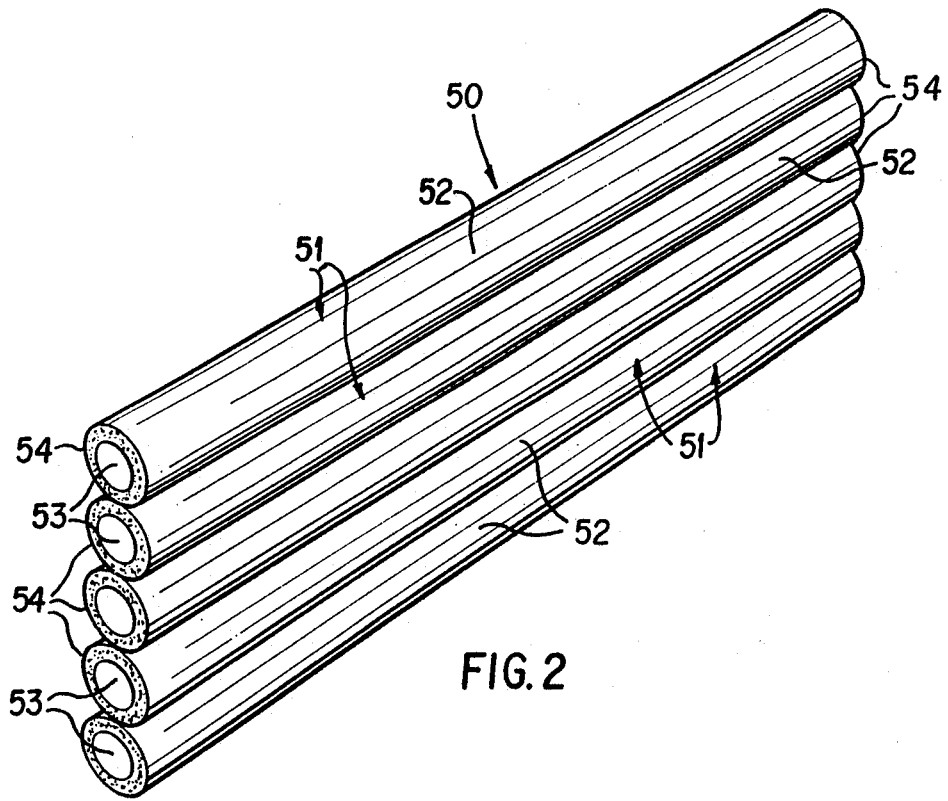
FIGS. 2, 2a and 2b are perspective views of further alternate embodiments of foam panels incorporating the present invention, having a substantially rectangular shape and consisting of a single layer of elongated foam members welded together in a side by side, substantially parallel configuration.
Figure 23:
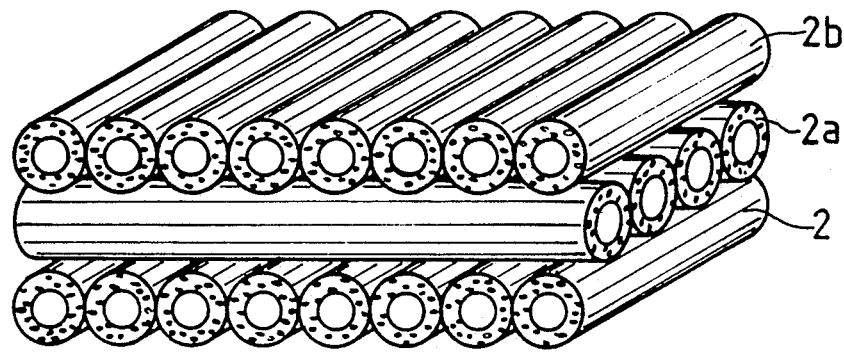

FIG. 23 is a perspective view of three superposed tube panels, the top and bottom tube panel corresponding to that of FIG. 1, while the intermediate tube panel corresponds to the tube panel of FIG. 2.

Figure 24:
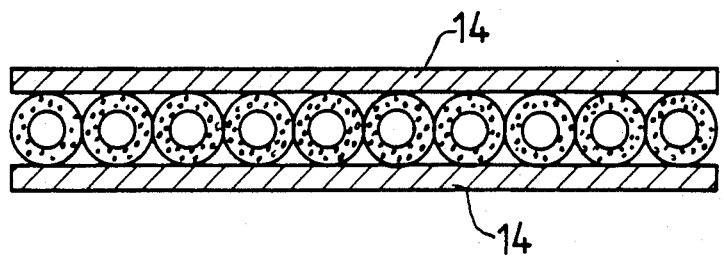

FIG. 24 is a cross-section through a foam panel with a foam layer 14 laminated to both sides thereof.

Figure 25:
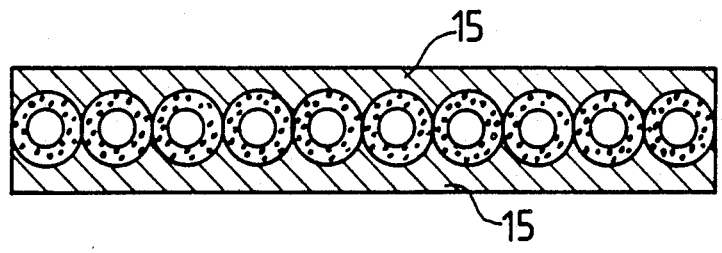

FIG. 25 is a cross-section through a foam panel onto which a synthetic resin layer 15 has been foamed on both sides.

Figure 26:
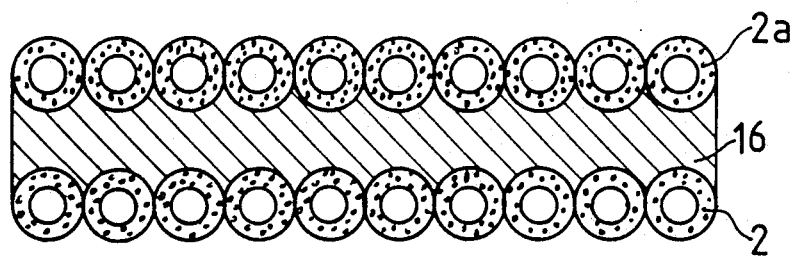

FIG. 26 is a cross-section through a foam panel in which two tube panels 2 and 2a are joined together by way of a foam layer 16.

Figure 27:
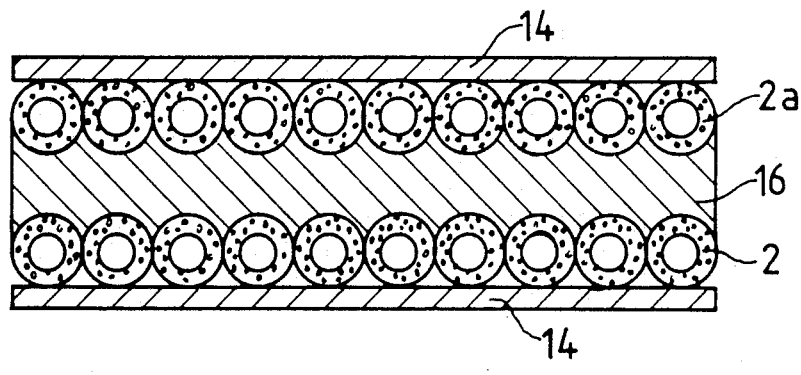

FIG. 27 is a cross-section through a foam panel according to FIG. 26 with a foam layer 14 additionally laminated to both sides thereof.

Figure 28:
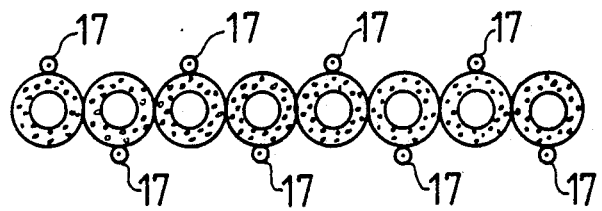

FIG. 28 is a cross-section through a foam panel provided on both sides at spaced intervals with spacers in the form of round foam sticks 17 which may optionally have a wire core.

Figure 29:
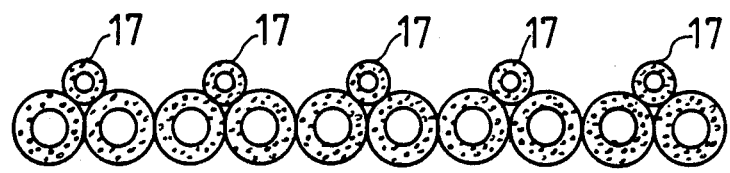

FIG. 29 is a cross-section through a foam panel to which smaller foam tubes 17 are welded to serve as spacers.

Figure 30:
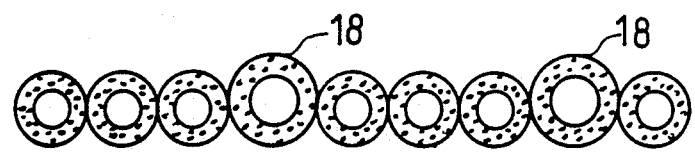

FIG. 30 is a cross-section through a foam panel in which at spaced intervals the standard tubes are replaced by larger tubes 18 which project from one side and in this way perform the spacing function.

Figure 31:
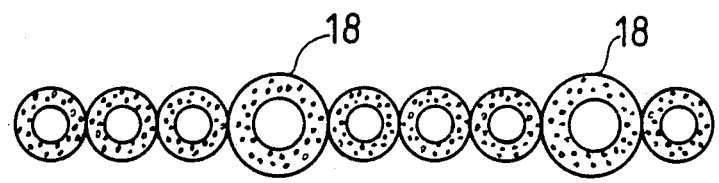

FIG. 31 is a cross-section through a foam panel of a structure similar to that of the foam panel in FIG. 30 except that the larger tubes 18 are so arranged that they project uniformly from both sides and in this way can perform the spacing function in two directions. Of course, also a modification is imaginable where said larger foam tubes 18 project more from one side than from the other side.

Figure 32:
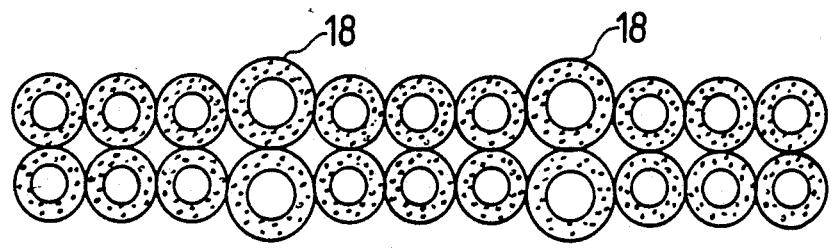

FIG. 32 is a cross-section through a foam panel composed of two tube panels according to FIG. 30 in which the larger tubes 18 again perform the spacing function.

Figure 33:
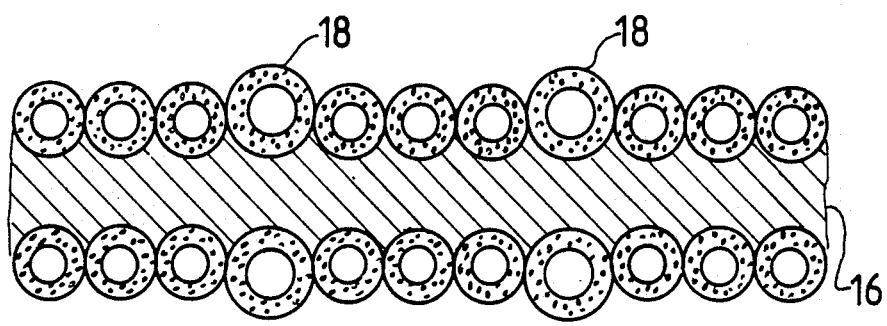

FIG. 33 is a cross-section through a composite foam panel in which two tube panels according to FIG. 30 are joined by a foam interlayer 16. Here, too, the larger tubes 18 serve as spacers.

Figure 34:
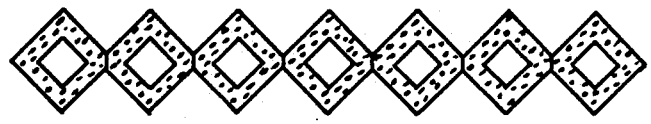

FIG. 34 is a cross-section through a foam panel of quadrangular hollow profiles joined cornerwise. The free corners of said panel serve as spacers.

Figure 35:
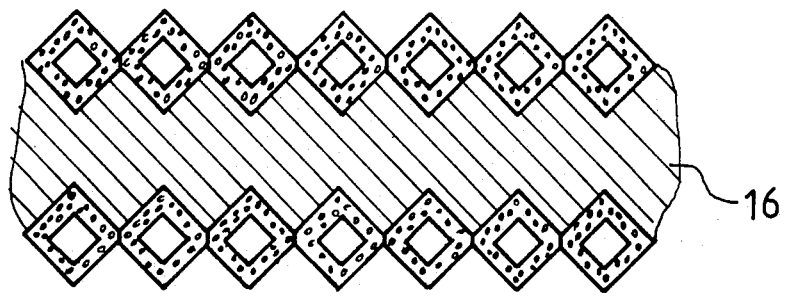

FIG. 35 is again a cross-section through a composite panel, this time composed of two panels according to FIG. 34 which are joined together by way of a foam layer 16. The free corners of the panels composed of the quadrangular hollow profiles again function as spacers.

Figure 36:
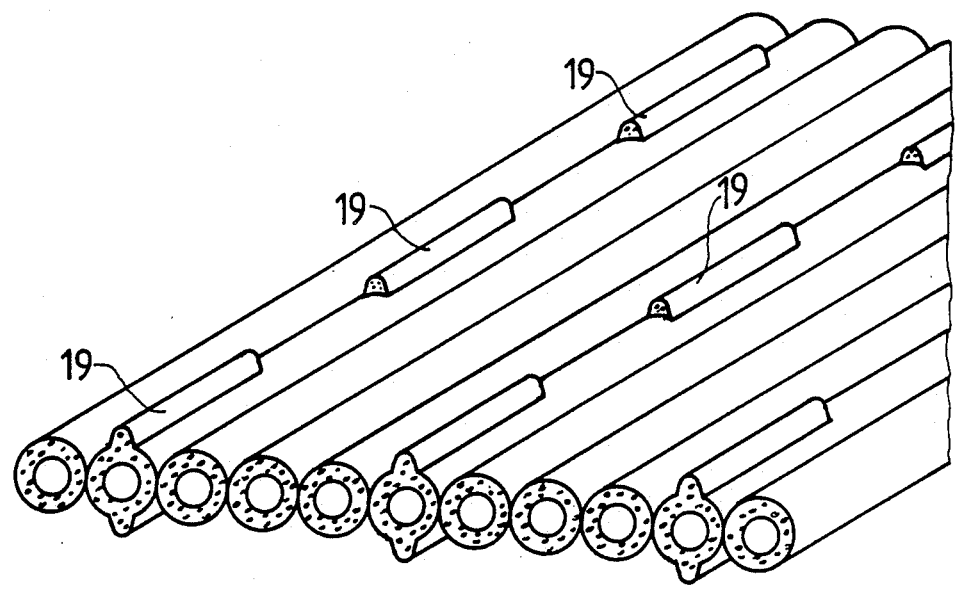

FIG. 36 is a schematic perspective view of a foam panel in which foam tubes having generally the same diameter as the other foam tubes are arranged and additionally carry a rib 19 on top and on the bottom; said rib may be cut away or pressed down in places, and the length of the ribs may vary. The ribs again serve as spacers. Of course, among said ribbed tubes also embodiments are possible which carry the rib on only one side.

Figure 37:
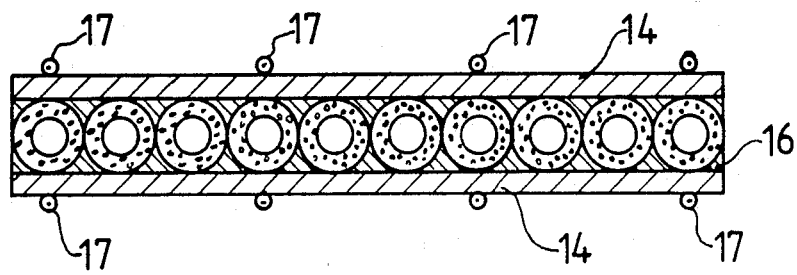

FIG. 37 is a cross-section through a foam panel with a facing layer 14 on both sides joined to the tube panel by means of foam 15. Moreover, on the homogeneous facing layers there are provided at spaced intervals round foam rods 17, optionally with a wire core, as spacers.

FIG. 38 shows a section through two panel edges having round edge profile bars 9', 9'a welded thereto. Said round edge profile bars are larger than the tube diameters so that they uniformly project on both sides and in this way act as spacers on both sides.

FIG. 39 likewise is a section through a round edge joint between two panels in which, however, the round edge profile bars 9'', 9''a are welded to the tube so that they project on only one side as spacers.

FIG. 40 is a cross-section through a foam panel provided on one side with drain holes 20.

FIG. 41 demonstrates the use of a foam panel provided on one side with a foam layer 15 and on the other side with spacers 17 and disposed in the space formed in an external building wall between the external wall proper and the facing provided in front thereof. The foam layer 15 comes to lie against the wall constituting the supporting wall, while the spacers lie against the curtain wall which may consist, for example, of klinker bricks.

Figure 42:
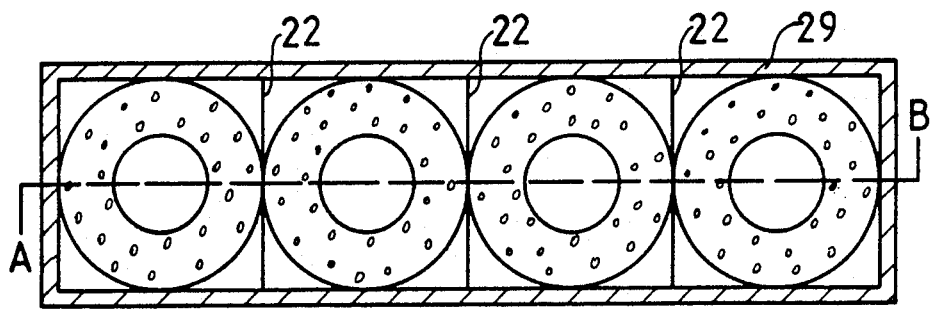
Figure 43:
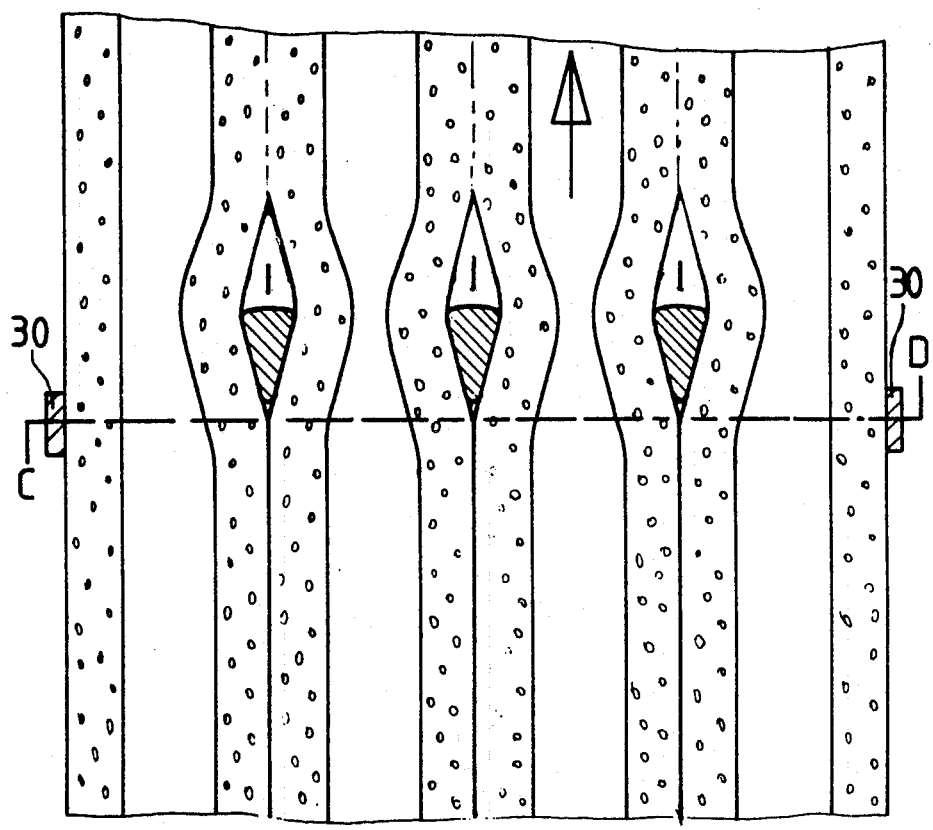

FIG. 42 is a vertical section through a lattice arrangement according to the invention with three welding apparatus along the line C–D in FIG. 43 for welding foam tubes together which are disposed side by side and which, in practice, is so designed that—depending on the tube diameter—ten to twenty tubes can be welded together simultaneously in one plane.

FIG. 43 is a horizontal longitudinal section along the line A–B in FIG. 42.

Figure 44:
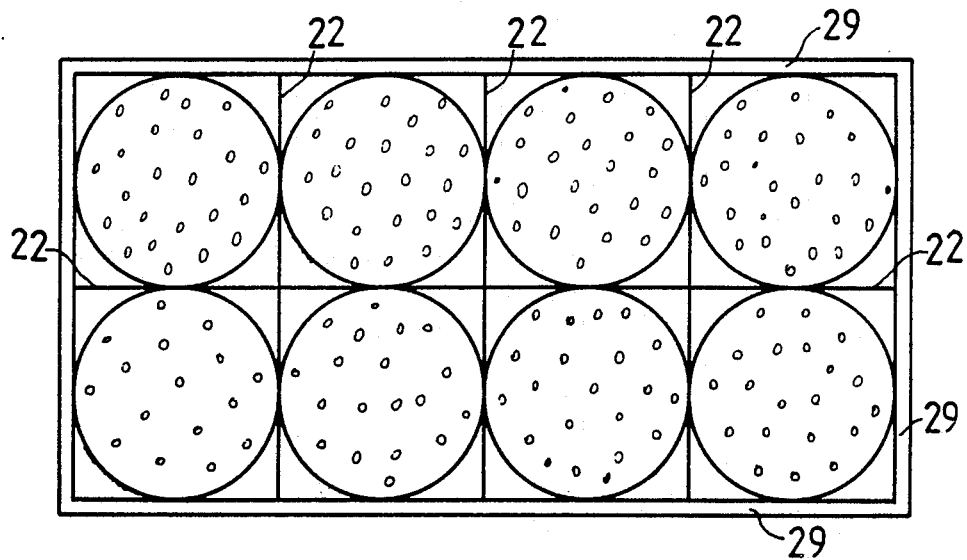

FIG. 44 is a vertical section through a lattice arrangement according to the invention with one horizontally and three vertically disposed welding means for simultaneously welding foam tubes arranged side by side and one above the other.

Figure 45:
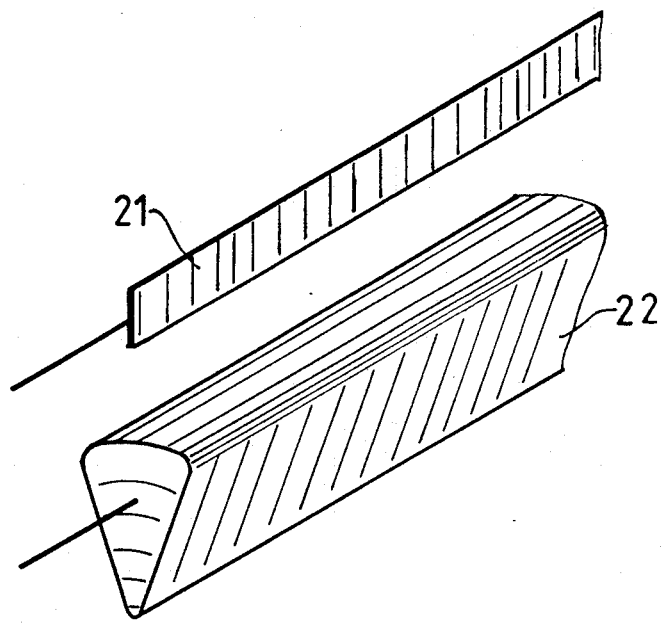

FIG. 45 is a schematic perspective view of the wedge-shaped embodiment of the spacer means preferred according to the invention and thereabove an electrically heated heat conductor in the form of a metal strip.

Figure 46:
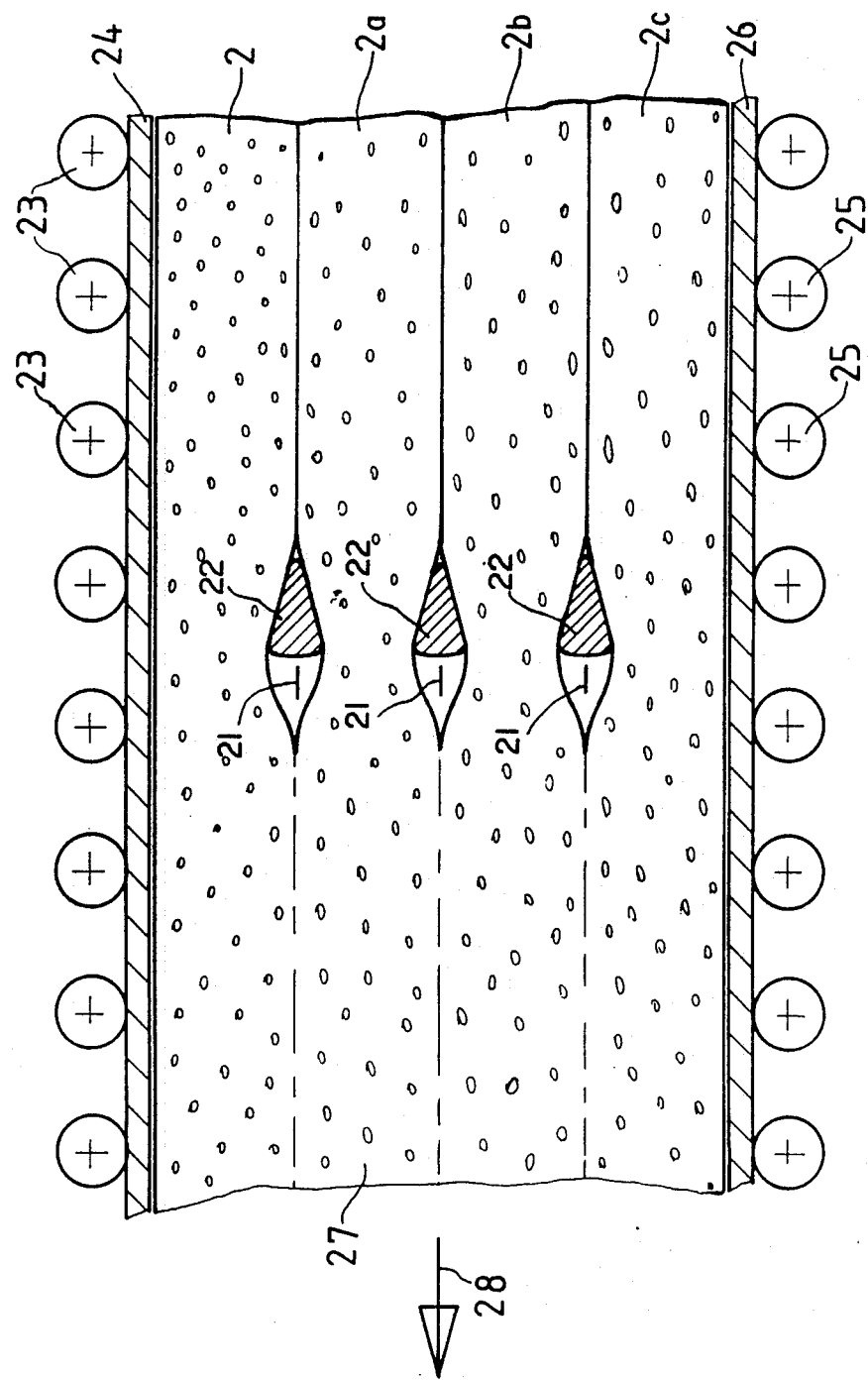

FIG. 46 is a vertical longitudinal section through the welding apparatus arranged according to the invention in a twin belt system for welding together the tube panels 2, 2a, 2b and 2c.

Figure 47:
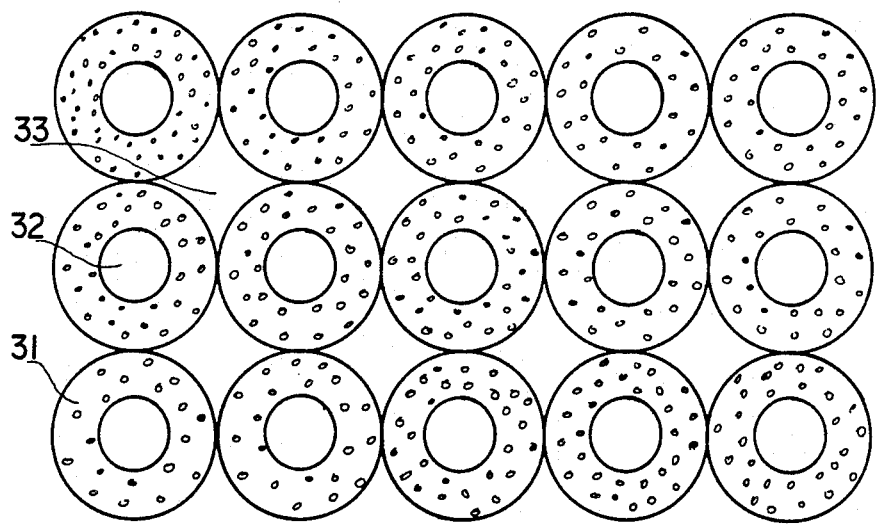

FIG. 47 is a plan view of a super-lightweight panel with holes 2, 3 obtained when a block according to the invention composed of round foam tubes is cut vertically normal to the longitudinal axes of the foam tubes into panels of desired thickness.

Figure 48:
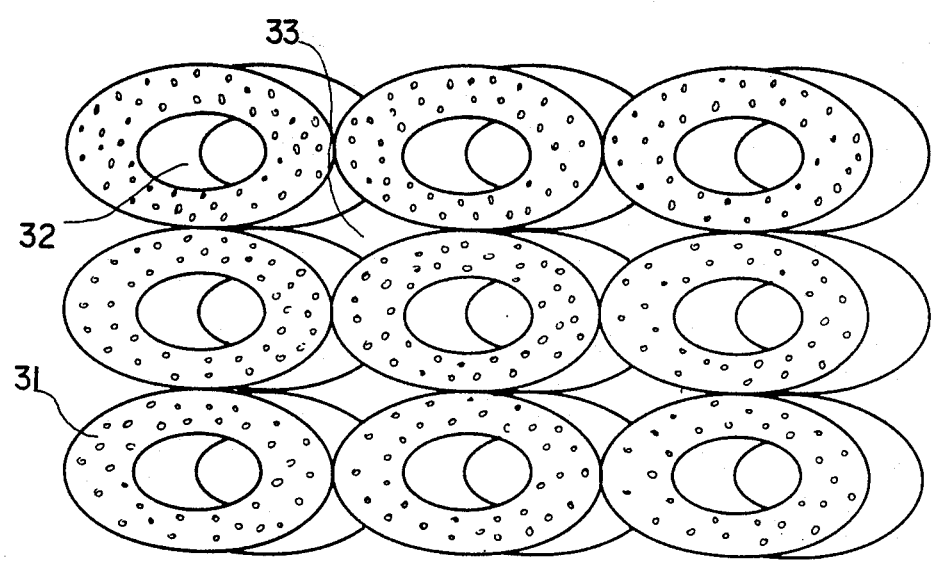

FIG. 48 is a plan view of a super-lightweight panel with oval holes 2 and extending holes 3 obtained when a block of round foam tubes according to the invention is cut vertically, but at an angle of about 45° with respect to the longitudinal axes of the foam tubes, into panels of desired thickness.

DETAILED DISCLOSURE

In FIG. 1, one embodiment of a panel 50 is depicted wherein panel 50 comprises a plurality of independent, elongated members 51 arranged in a side by side manner and integrally affixed to each other to form a substantially continuous, rectangular shaped panel 50. As shown in FIG. 1, each independent elongated member 51 comprises a substantially hollow cylindrical shape having an outer peripheral surface 52, an elongated central bore 53 extending the entire length thereof, and terminating ends 54, 54.

In addition, all of the elongated members 51 forming panel 50 are substantially identical in length and are arranged side by side, with the central axes of each member 51 being substantially parallel to adjacent members, with the axes thereof lying in substantially one plane. Furthermore, a portion of the outer peripheral surface 52 of each member 51 is securely affixed to the contacting portion of the outer peripheral surface 52 of each adjacent member 51. As a result, a single layer of integrally interconnected substantially cylindrically shaped members in attained. Since each of the independent elongated members 51 comprise substantially equal lengths, and are arranged in a side by side construction with the central axis of each of said elongated members being arranged in a parallel side by side relationship, terminating ends 54, 54 of each of the members 51 define the substantially continuous, flat side edges of panel 50.

Figure 1A:
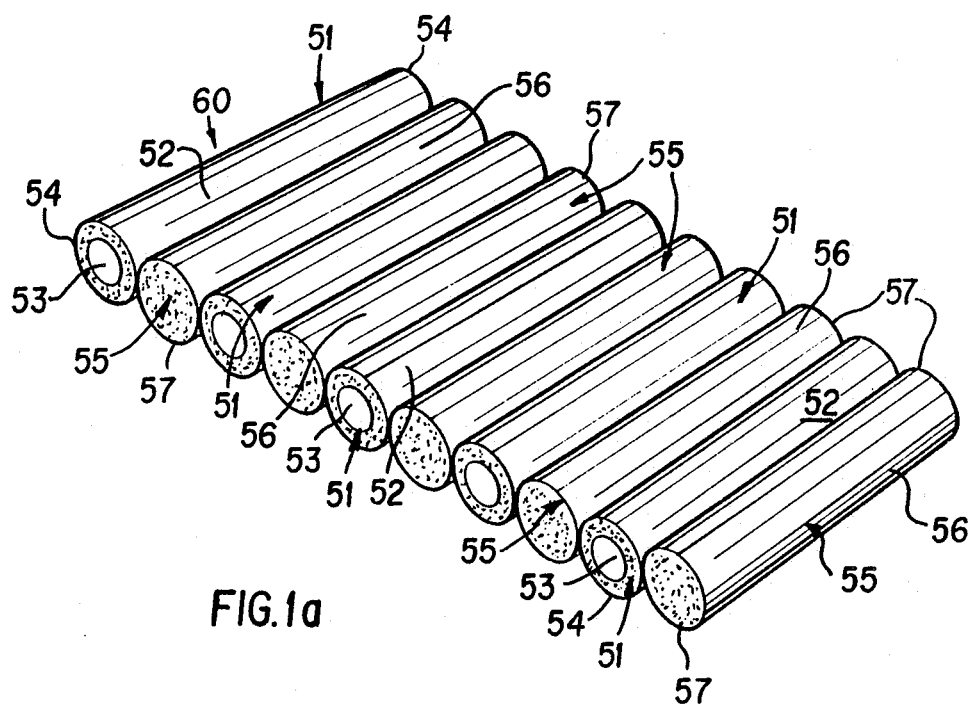

In FIG. 1a, an alternate construction for a panel is depicted as panel 60. In this construction, hollow tube members 51 are employed along with a plurality of elongated, independent solid members 55. As shown, each solid member 55 comprises an overall solid cylindrical shape defined by an outer peripheral surface 56, and terminating ends 57, 57.

In this embodiment, elongated, independent members 51 and 55 preferably comprise substantially identical overall lengths and are arranged in an alternating side by side configuration, with the central axis of the members being parallel to each other and lying in a single plane. In addition, the outer peripheral surfaces 52 of members 51 are securely affixed to the outer peripheral surfaces 56 of each adjacent member 55 along the zone of contact. As a result, a single layer of securely affixed integrally engaged members is attained comprising alternating hollow members 51 and solid members 55 affixed to each other.

Figure 1B:
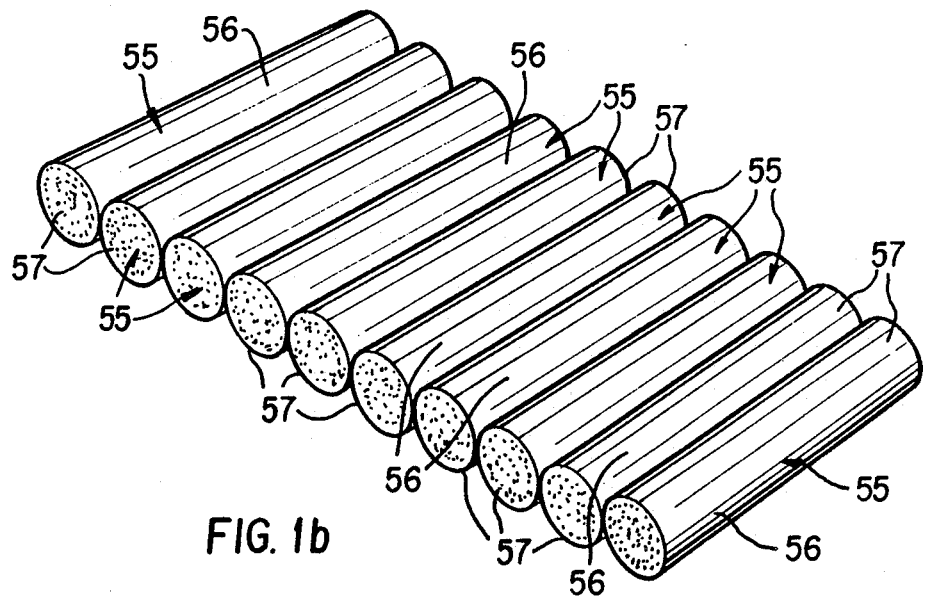

In FIG. 1b, a third embodiment for a panel is depicted as panel 65, wherein panel 65 is formed by employing only a plurality of independent, elongated members 55, which are arranged and integrally joined to each other in a substantially identical fashion as detailed above in reference to panels 50 of FIG. 1 and panel 60 of FIG. 1a. As previously detailed, elongated, independent members 55 each comprise a substantially continuous elongated block of material without any central cavity or core extending axially therethrough. As a result, elongated independent members 55 are substantially stiffer and less flexible than elongated members 51.

As is more fully detailed below, blocks or panels incorporating the present invention can be employed for a variety of uses, including various leisure products, which have previously been incapable of being satisfied by the current state of the art products or manufacturing techniques. In particular, cushions, floats, rafts, toboggans, skiis and sleds can all be constructed in a variety of configurations by employing the teaching of the present invention.

Furthermore, depending upon the particular end use for which a block or panel is employed, either all hollow members, all solid members or a combination of both hollow and solid members can be employed. In general, by employing only hollow elongated members 51, a more flexible cushioning type panel construction is attained. By employing only elongated, homogeneous solid core members 55, a stiffer panel construction is achieved which is capable of resisting more rigorous, repeated harder use.

By way of example, panel 50 shown in FIG. 1 is efficiently and easily employed as a chair cushion or a highly portable knee pad for use in gardens. Alternatively, panel 65 depicted in FIG. 1b can be employed as a gymnastic pad or cushion, where greater weight and repeated use would be experienced. Finally, panel 60 depicted in FIG. 1a which, incorporates alternately positioned solid and hollow elongated members, can be employed where a combination of both resilience and cushioning is desired.

In the preferred embodiment, independent, elongated members 51 and 55 are formed from synthetic resin materials, in general, and thermoplastic synthetic resin foam materials in particular. Examples of synthetic resin foam materials which have been found to provide the desired characteristics for members 51 and 55 include foams made from polyurethane, polystyrene, polyolefins and polyethylenes. In general, the weight to volume ratio and the flexibility and resilience required for a particular end use are the criteria upon which the selection of a particular synthetic resin foam material is based.

Furthermore, although the elongated, independent members 51 and 55 shown in the drawings are depicted as comprising circular cross-sectional profiles, the elongated members may comprise any desired configuration or cross-sectional shape. Depending upon the particular end use desired, the elongated, independent members may comprise cross-sectional profiles or shapes which are rectangular, square, oval or any other desired polygonal shape.

In addition, although the terminating ends of the independent elongated members 51 and 55 are generally shown as being formed substantially perpendicularly to the central axis of the elongated members, the terminating ends can be formed at any desired angle to the central axis or in any desired configuration.

In addition to having the elongated independent tube members 51 constructed in the manner depicted in the drawings, namely with substantially circular cross-sectional overall shapes and substantially circular cross-sectional central bores or cavities, tube members 51 can be constructed with a central bore or hollow cross-sectional profile having a shape substantially different from the cross-sectional shape of the tube member itself. Consequently, a tube member 51 may comprise a rectangular overall shape, while the central bore or cavity thereof comprises a circular shape. Of course, without departing from the scope of the present invention, any combination of shapes can be employed for an elongated, independent member 51 and its centrally disposed elongated bore.

In FIG. 2, another embodiment of panel 50 is shown which is similar in construction to panel 50 of FIG. 1. In both constructions, a portion of outer peripheral surface 52 of each elongated, substantially cylindrical hollow tube members 51 is securely affixed to the contacting portion of outer peripheral surface 52 of adjacent tube members 51. In this embodiment, members 51 are arranged in a substantially side by side configuration, with the central axis of each tube member 51 being substantially parallel to the central axis of the adjacent tube members, with each of the central axes lying in a substantially single plane.

The only difference between the two embodiments depicted in FIGS. 1 and 2 is found in the overall length of the elongated tube members 51 forming the particular panel configuration. As shown in FIG. 2, tube members 51 comprise a substantially greater length than do the tube members employed in panel 50 of FIG. 1. Comparing the two panels to each other, it is readily apparent that the terminating ends of tube members 51 which define the side edges of the substantially rectangular panel 50 in each of the two embodiments, comprises the shorter rectangular dimension in panel 50 of FIG. 2, while comprising the longer rectangular dimension of panel 50 in the embodiment depicted in FIG. 1.

Based upon this disclosure, it is apparent to one of ordinary skill in the art, independent elongated members 51 may be constructed in any desired length or with any desired terminating end configurations, in order to attain the desired shape for the final product. If desired, tube members of different length can be securely affixed to each other to form a panel construction which is substantially circular in shape or comprises any other desired geometric pattern. However, for purposes of example only, rectangular panel configurations are depicted in the drawings.

Figures 2A, 2B:
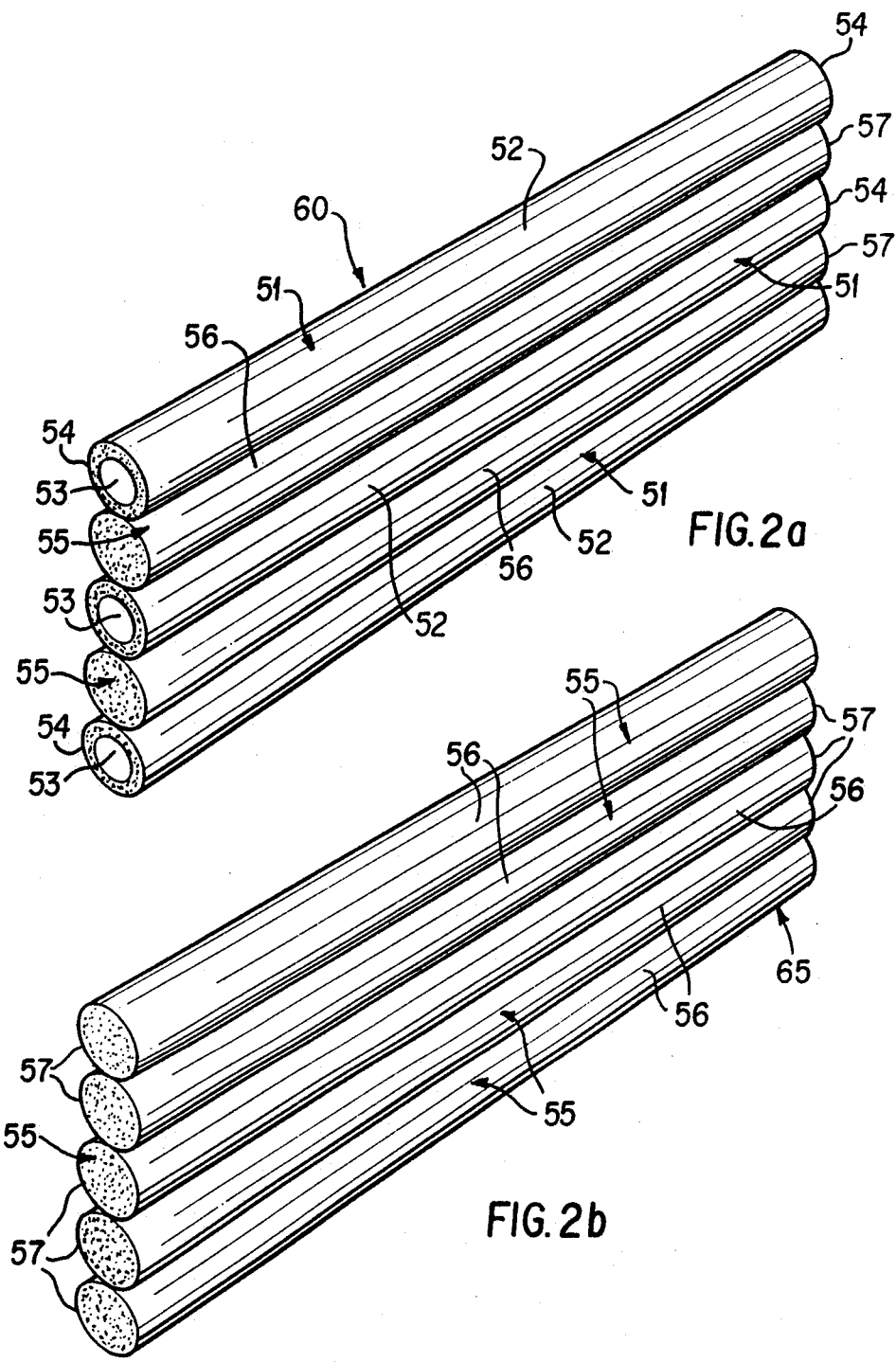

In FIG. 2a, a rectangular panel 60 is depicted having an overall configuration and construction similar to panel 50 of FIG. 2. As detailed above in reference to FIG. 2, panel 60 of FIG. 2a is substantially identical in construction to panel 60 of FIG. 1a, by employing both elongated substantially cylindrically shaped hollow tube members 51 in combination with elongated solid core members 55 securely affixed to tube members 51 in an alternating pattern. As discussed above, panel 60 of FIG. 2a and panel 60 of FIG. 1a both comprise a combination of tube members 51 and 55 which are securely affixed to each other in a side by side relationship, with the central axes of tube members extending substantially parallel to each other and lying in substantially a single plane.

Finally, in FIG. 2b, an alternate embodiment of panel 65 is depicted which is similar in overall construction to panel 65 of FIG. 1b. As previously discussed, the length of each of the elongated independent members 55 forming panel 65 of FIG. 2b are substantially greater than the length of independent members 55 of FIG. 1b. As a result, panel 65 of FIG. 2b comprises a substantially rectangular shaped panel construction with the terminating ends of members 55 defining the shorter dimension of panel 50, while the terminating ends of independent members 55 in FIG. 1b define the longer dimension of the rectangular shape of panel 65 thereof.

In FIG. 3, a block 70 is depicted, comprising two panels 50, 50 integrally connected to each other. As detailed above each panel 50 of this embodiment comprises a plurality of integrally connected securely affixed elongated hollow tube members 51, with the abutting, outer peripheral surfaces 52 of each of the tube members 51 of each of the panels 50 being securely affixed to each adjacent member 51 along the common zone of contact. In addition, the outer peripheral surface 52 of each member 51 of the first panel 50 is securely affixed to outer peripheral surface 52 of each member 51 of the second panel 50 along the common zone of contact existing therebetween. As a result, block 60 comprises two distinct layers of elongated hollow tube members 51, with all of the tube members 51 contained therein being securely affixed to every adjacent tube member 51, whether positioned to the side, top or bottom thereof.

Figure 4:
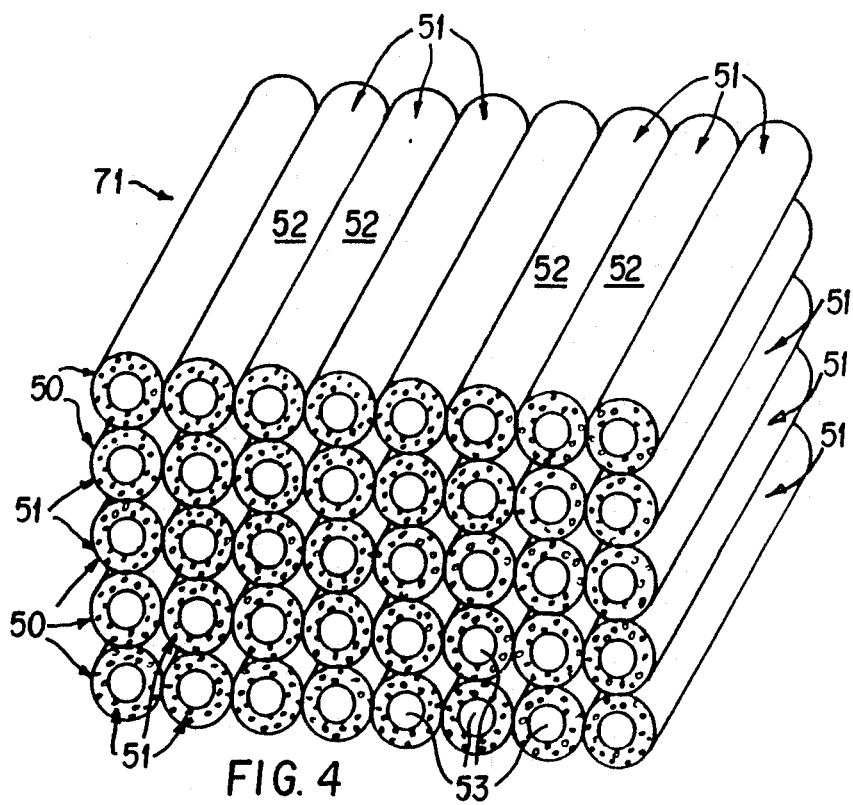
FIGS. 4, 4a and 4b are perspective views of alternate embodiments of foam blocks incorporating the teaching of the present invention and consisting of five panels of foam members welded together.

In FIG. 4, another block 71 is shown as a further example of a block formed from bonded, welded or glued interconnected engagement of a plurality of a plurality of panels 50. As is apparent from FIG. 4, block 71 is constructed in a manner similar to block 70 as described above in reference to FIG. 3 and provides substantially greater depth in order to accommodate a particular end use.

Figure 3A:
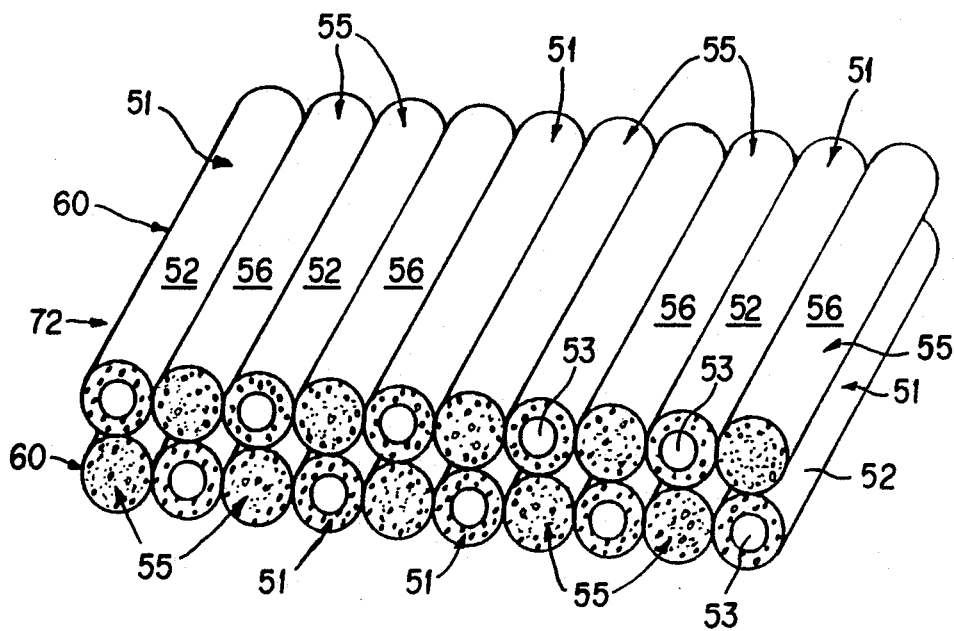

In FIG. 3a, block 72 is depicted which incorporates two separate panels 60 securely affixed to each other. As detailed above, each of the panels 60 comprises a plurality of independent elongated tubular members 51 interconnected with a plurality of adjacent elongated, independent solid members 55. As discussed above, by incorporating both hollow tube members and solid members simultaneously in secure bonded or welded engagement with each other, a unique two-layer construction is attained wherein both flexibility and resilient rigidity is attained. In this way, a particular desired end use can be tailor made for achieving the best desirable characteristics needed for a particular use.

Figure 4A:
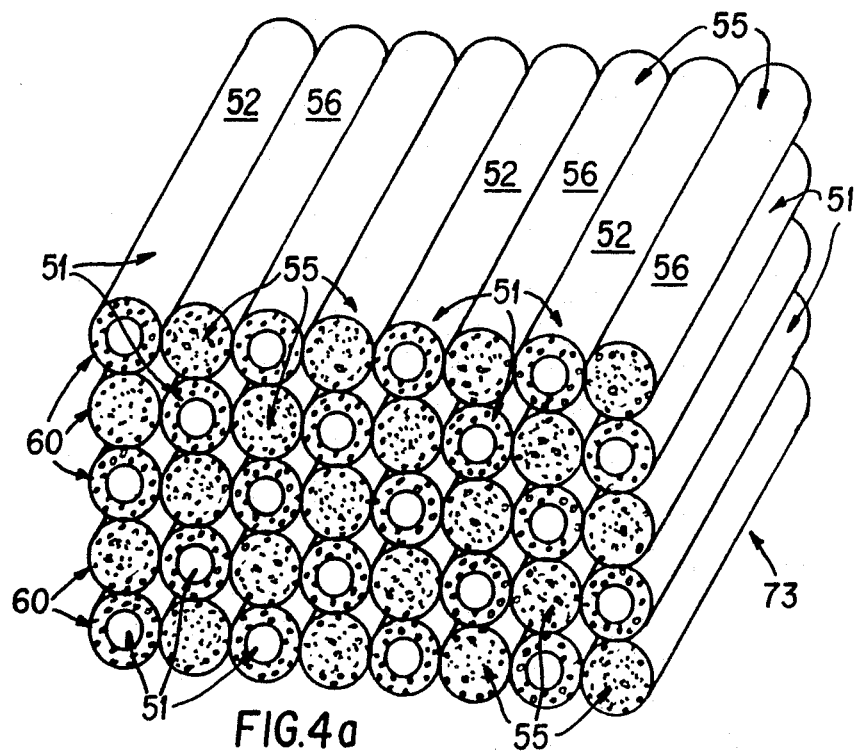

In FIG. 4a, block 73 is shown as an alternate embodiment wherein a plurality of panels 60 are securely affixed to each other to attain a substantially larger configuration. Of course, as will be apparent to one of ordinary skill in the art, a block can comprise any number of panels of any size, shape, or length, depending upon the particular end use desired.

Figure 3B:
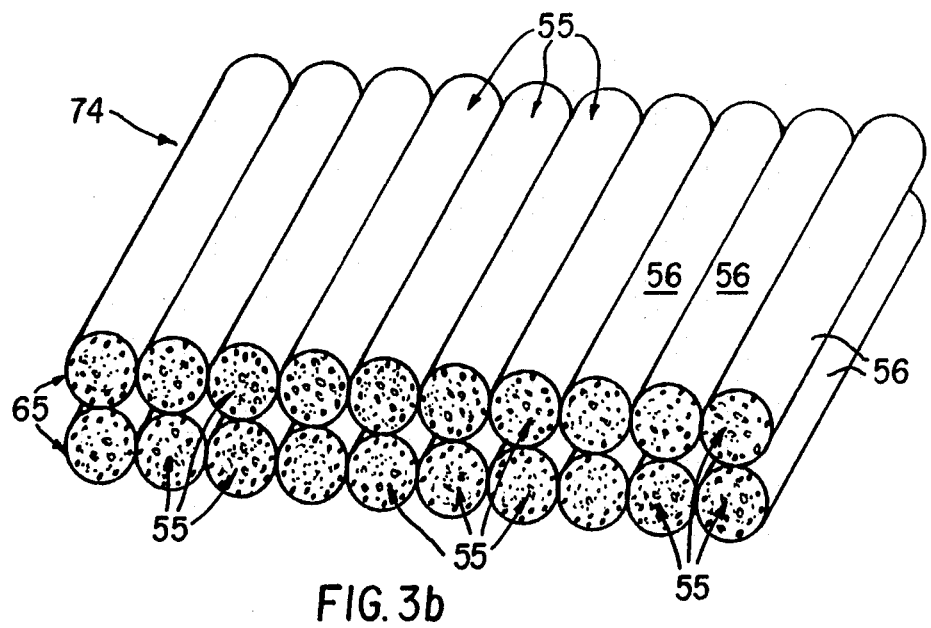

In FIG. 3b, block 74 is shown comprising two integrally interconnected panels 65. As detailed above, each panel 65 comprises a plurality of elongated solid members 55 securely affixed to each other in a substantially aligned side to side manner. As shown in FIG. 3b, block 74 comprises a two layer construction to attain a particular end use characteristic.

Figure 4B:
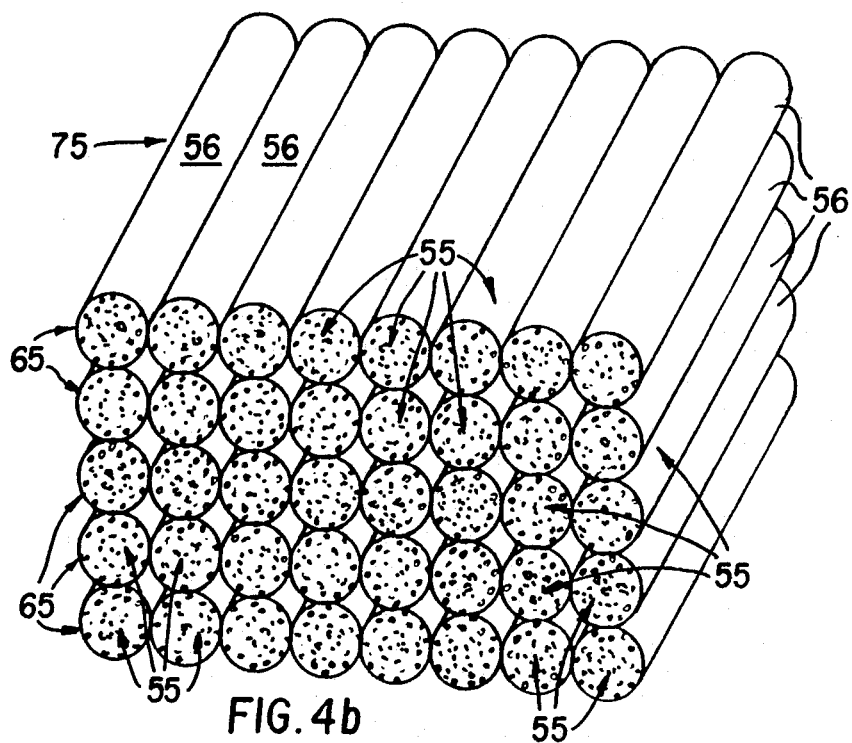
Figure 6:
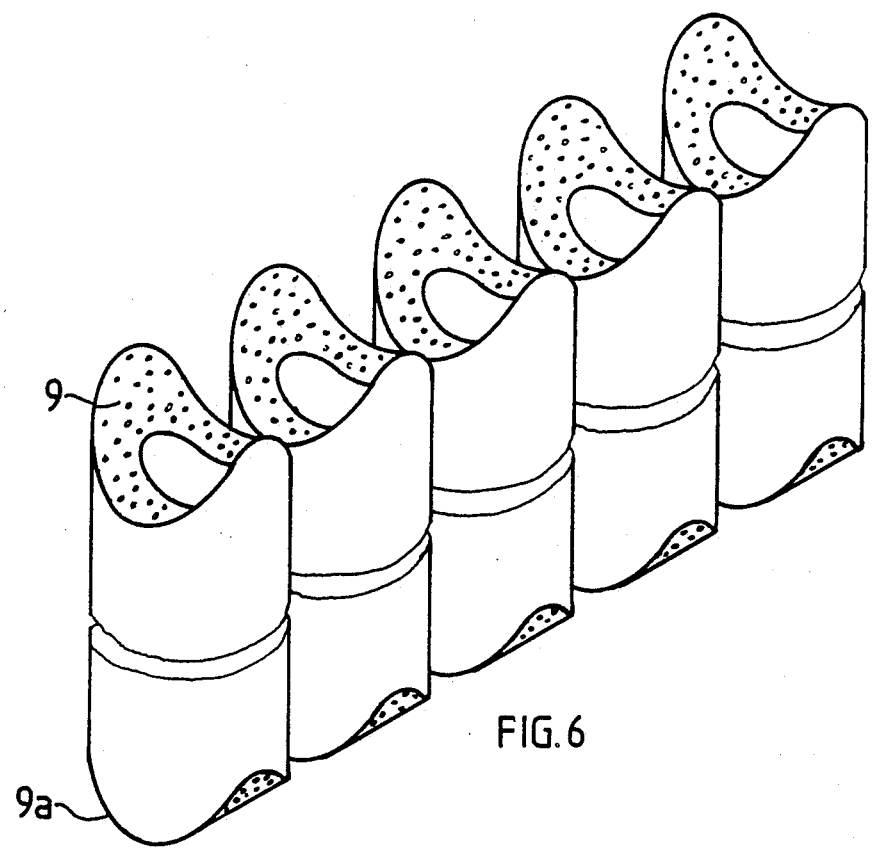
FIG. 6 is a perspective view of a foam panel according to FIG. 1 where the panel edges formed by the tube ends have a round configuration 9, 9a cut out of the tube ends.
Figure 6A:
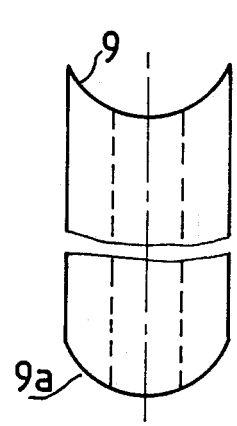
FIG. 6a is a plan view of the panel edge 6 formed by the tube wall of the first tube in the foam panel.
Figure 6B:
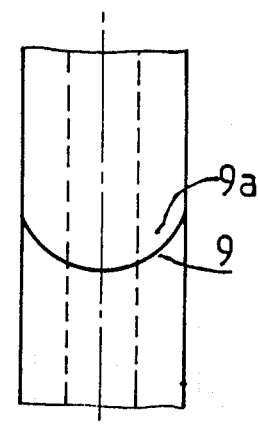
FIG. 6b is a plan view of the round edge 9, 9a as formed when two matching foam panels according to FIG. 6 are put together.

In FIG. 4b, block 75 is shown as an alternate embodiment comprising a plurality of integrally engaged layers of panels 65 to attain a substantially larger integrally engaged block configuration for satisfying a particular desired end result.

In accordance with the present invention, elongated members 51 and 55 are securely affixed to each other by gluing or welding in order to form a particular panel configuration. In addition, the panels are glued or welded together to form blocks of any desired size and shape.

In the preferred embodiment, the welding process is characterized in that the outer peripheral surfaces of the synthetic resin members are heated to their melting temperature, while being guided over spacing means positioned at a fixed distance about the heated conductor serving as the heat source. In this way, the synthetic resin surfaces being welded, together, along with the spacer means, form a heating channel surrounding the heat source.

If desired, the heating channel can be closed at its forward and rearward end. To carry out this process, apparatus is used which is characterised in that it comprises at least one electrically heatable heat source, a spacer means provided in front of each of said heat source(s), and a means for pressing the superficially molten surfaces together.

The materials to be welded together according to the present invention may consist of any desired synthetic resin. However, the process of the invention is preferably carried out with thermoplastic synthetic resin materials that can be bonded together only insufficiently by adhesives or by solution welding. Examples of such materials include polyolefins, such as polyethylene, especially low-density polyethylene in the form of foams, preferably of a density of less than 50 kg/cm$^3$, especially less than 20 kg/m$^3$ The apparatus serving to carry out the process of the invention essentially consists of a heat source, a spacer means arranged in front thereof, and a means, arranged downstream of the heat source, for pressing the superficially molten surfaces together. The heat source preferably consists of an electrically heatable heat conductor, especially in the form of a wire or metal strip.

Preferably, the wire or the metal strip consists of a chromium-nickel alloy or chromium-nickel-aluminum alloy, or an iron-chromium nickel alloy. However, other metals or metal alloys, or non-metallic heat conductors which are commonly used as resistance heating means, such as silicon carbide heat conductors, may be employed with substantially equal efficacy.

The temperature to which the heat conductor is heated varies within a wide range, e.g. from 600° to 1200° C., and depends on the material to be welded and the speed at which the synthetic resin surfaces are guided past the heat conductor. At high speeds of travel and/or with high-melting thermoplastic synthetic resins it may be advantageous or necessary to arrange two or more heat conductors in series in the direction of travel of the synthetic resin surfaces to be welded together. In order to avoid sagging of the heat conductors, and thus non-uniform heat radiation, it is preferred according to the invention to always hold the heat conductors taut, especially when in the form of wires or metal strip, particularly, when the conductors are hot. The tensioning means preferably also serves as a power supply connector, and favorably utilizes the elastic force of a tension or a compression spring. According to the preferred embodiment, the power supply can be controlled or regulated by means of a thermocouple provided in the vicinity of the heat conductor.

In order to form a heating channel, and in order to guide the synthetic resin surfaces to be welded together past the heat conductor at a certain distance from and out of direct contact with said heat conductor, spacer means is provided shortly ahead of the heat conductor. Said spacer means preferably is wedge-shaped and so arranged that the sharp edge of the wedge is oriented towards the oncoming material, while the back of the wedge faces the heat conductor.

The length of the wedge and of the heat conductor depends on the width of the areas to be welded together. The sharp edge of the wedge is preferably slightly rounded in order not to hurt the oncoming material. The wedge back is preferably of convex shape and its longitudinal edges are likewise rounded in order to avoid damage to the material. Of course, the back of the wedge may also be of concave shape; in that case the lateral edges are preferably rounded, too.

Since this spacer wedge at the same time serves as a heat shield, it may be suitable to provide the spacer wedge with one or more bores or passages in longitudinal direction to provide a possibility of passing coolant medium through the spacer wedge in case the spacer wedge is in danger of overheating, if it is in operation for extended periods of time. For special uses, e.g. when a heating channel substantially closed on all sides is desired, the open space downstream of the spacer wedge can be covered on both sides by a cover extending from the wedge. The wedge flanks are preferably highly polished in order to reduce friction.

According to another embodiment of the invention, the spacer means can also be a pair of rolls, and in that case the roll diameter and the roll length must be adapted to the prevailing practical requirements. Pairs of spacer rolls are preferably used according to the present invention in cases where, for example, relatively thick and/or wide panels (panels of a thickness of 8 or 16 cm and a width of one meter or more) are to be welded together, or in cases where the foam panels of the invention are to be laminated with corresponding homogeneous or foamed film or sheets or other facing layers, in order to minimize friction between the foam panels and the spacer means. Also, with the use of pairs of spacer rolls preferably supported in ball bearings it may be desirable to cool the rolls. In such cases, at least one of the two rolls is hollow and is so constructed that a coolant medium can be passed therethrough.

As detailed above, by employing spacer means it is possible to guide the synthetic resin surfaces to be welded together at a distance past the heat source to thereby superficially melt the synthetic resin surfaces. Then, after having passed by the heat source, the molten surfaces are compressed by means of suitable devices, e.g., by pressure rolls. After the material has cooled down, the welding operation is terminated.

According to the present invention, independent, elongated foam members made of low-density polyethylene and having volume weights of less than 50 kg/m$^3$ or 20 kg/m$^3$, respectively, can be welded together to form panels of any desired width. The width of the foam member areas which are welded together can be varied by accordingly compressing the foam members, e.g., by varying the distance between the juxtaposed welding means of the invention, the dimensions of the spacer means, and the nip between the pressure rolls which may be provided downstream of the heat source. Since the welding means of the invention can be arranged not only side by side but also one above the other, the foam members can be simultaneously welded together side by side and one above the other by means of such a lattice welding system, so that the panels or blocks of any desired size composed of the foam members are obtained.

Furthermore, by employing the present invention, it is possible to attain a continuous mode of operation. For example, manufacturing continuity can be attained by employing a twin belt system in which the welding means of the invention is integrated to produce sandwich elements having a polyethylene foam core, which otherwise can be adhesion-bonded only with difficulty (if at all), and metallic or other facing layers to which the molten polyethylene firmly adheres.

According to the present invention, the foam members are welded together by the mode of operation illustrated by FIGS. 42 to 44. At the frame 29 assembled, for example, from steel tubing (of FIGS. 42 and 44) the wedge-shaped spacer means 22 are disposed in vertical arrangement (see FIG. 42) and in FIG. 44 additionally in horizontal arrangement with their wedge blades visible in FIGS. 42 and 44. In the middle behind the wedge-shaped spacer means, the associated heat conductors 21 are arranged (see FIGS. 43 and 45)

which are always held taut by means of spring tensioning devices, not shown. The spaces between the wedge-shaped spacer means 22 and the lateral confining bars 30, whose distance from one another decreases somewhat in the direction of travel, are preferably so selected that the foam tubes, after having travelled past the welding means, fuse together over a wide area. In order to exert additional pressure on the superficially molten walls of the foam members, there is preferably provided, shortly behind the welding means and across, i.e., normal to the direction of travel, a pair of rolls whose rolls are spaced apart from each other and between which the foam members are guided.

As shown in FIG. 42, a plurality of welding apparatus can be arranged side by side so that any desired number of foam members can be easily welded together to form a panel of any desired size and shape. The same applies to the "lattice system" illustrated by FIG. 44 by which a plurality of foam members or panels, disposed side by side and one above the other can be simultaneously welded together to form a block. In view of practical considerations, however, it may be advantageous to simultaneously weld together 10 or 20 foam members disposed side by side, as shown in FIG. 42, and thereafter to weld the thus obtained panels, one above the other, as shown in FIG. 44, without the vertically arranged welding means, or with the use of the twin belt system shown in FIG. 46 which will be described hereafter.

FIG. 46 is a vertical longitudinal section through part of a twin belt system with upper conveyor belt 24 guided along rolls 23 and lower conveyor belt 26 guided along rolls 25. Between the upper and the lower conveyor belt 24, 26 there are four layers of foam panels to be welded together which, after having moved past the wedge-shaped spacer means 22 and the electrically heated heat conductors 21, are welded together to form a foam block 27. The arrow 28 indicates the direction of travel. Depending on the desired thickness of the welded panels or blocks, several welding apparatus of the invention can be disposed one above the other or step-wise one after the other in additionally provided corresponding systems.

Of course, it is also possible to so design the system that only one welding apparatus is provided. In that case, only two elongated foam members can be welded together to form the accordingly thicker panel. Moreover, with a properly designed system, panels or blocks of different thicknesses can be welded together.

The twin belt system can be laterally open, or it can be closed by two additional corresponding conveyor belts likewise moving over rolls. The additional lateral conveyor belts will be provided if lateral evasion of the foam material is to be avoided and thus the pressure for compressing the superficially molten surfaces is to be increased. Normally, i.e., also without lateral conveyor belts, the panels—even shortly after the introduction thereof into the twin belt system—are already subject to such high pressure that, owing to their flexibility, they are sufficiently compressed by their own expansion, after having travelled past the welding means.

The foam panels and blocks according to the present invention can also be produced by direct extrusion welding. In this continuous process, the foamable synthetic resin, preferably polyethylene, is extruded with propellant through suitable nozzles and is allowed to freely foam in the air to form a foam tube. When in this process, a multiplicity of nozzles are arranged side by side and/or one above the other in such a way that the foamed members contact each other, which happens already very shortly after extrusion through the nozzle. If care is taken that they are additionally pressed one against the other, for example by suitably arranged pairs of rolls, one obtains the desired foam panels and blocks "in one step". The welding effect can optionally be enhanced by installation of additional heating means directly downstream of the nozzle orifices in order to remelt any external skin that may have developed during foaming. Such heating means can be electrically heated wire or metal strip, or devices emitting hot air.

The foam panels welded together in any one of the modes described above are then cut to the desired length so that the cut made, for example, with a hot wire is performed such that the desired edge profile configuration is obtained as the material is cut to size. In this way, no waste is produced because the matching, interfitting counterpart is obtained automatically.

In case the cutting operation in connection with a desired type of edge profile configuration meets with difficulties, the corresponding edge profile can be cut in a simple manner, so that no waste is produced. The resulting edge profile configurations are then welded to the base panel, which may consist of one or two foam panels, for example, by means of the above described welding technique.

One end use for the foam panels of the present invention is for thermal insulation in the building industry, especially for application in the spaces of external walls, formed from supporting walls which are spaced away from associated curtain walls; between the rafters as roof insulation panels; as cast plaster floor insulating panels; as thermally insulating drainage panels underneath foundations; and as external insulation for underground brickwork.

By employing the teachings of this invention, foam panels or blocks may be made in a simple way and in any desired density. When such panels or blocks are used as thermal insulation, installed in the space between the external wall and the curtain wall, they exhibit the following advantages, inter alia:

(1) The foam can be adjusted to meet existing fire protection regulation.
(2) The lambda values can be adjusted between 0.025 and 0.050, as desired, and depending on the combination and fabrication of the elements, which may range from highly flexible to rigid.
(3) The installation by the mason is simple and foolproof. The panels or blocks do not rot.
(4) The foam panels or blocks are of light weight and are obtainable at low cost.
(5) The insulation value of vertical and/or horizontal columns having a lambda value of 0.0204 at 0° C. is utilized.
(6) They keep the interior-exterior walls "sound" by air columns (condensation balance; "breathing").
(7) They are not sensitive to shaking and vibration; they improve air-borne sound absorption; do not form cold paths; can be cut also at corners; are immune to moisture (pick-up $\pm 0\%$ $H_2O$).

In a likewise preferred embodiment of the invention, foam blocks produced according to the invention can, in turn, be cut into foam panels having super-light volume weight, particularly when cut off the block normal to the longitudinal axes of the tubes, or at any other angle with respect to the longitudinal axes of the tubes.

Such panels are used for the manufacture of quite a number of products, e.g. of gymnastics mats, of high jump cushions, of sandwich elements for sound absorption etc. For this purpose, the super-lightweight panels may be used as core and may be laminated with foam or provided with other facing layers. Moreover, super-lightweight composite panels can be produced by alternately welding the super-lightweight panels and solid foam panels, or by employing elongated solid-core foam members, as detailed above.

For the core function also, two or more super-lightweight panels can be welded together to again form thicker super-lightweight panels by means of the welding apparatus of the invention, namely such that the super-lightweight panels are superposed in such a way that the holes of one super-lightweight panel are covered by the foam areas of the overlying super-lightweight panel, which can be realized by accordingly dimensioning the initial foam tubes and optionally also be using, for the manufacture of the super-lightweight panels, foam blocks in which the tube panels are stacked in the manner of the foam panel of FIG. 22.

When in the super-lightweight panels, the holes or recesses resulting from the foam tube interiors and interstices between the foam tubes are filled with gypsum, cement or other material, and two or more of such panels, in turn, are welded together in mutually offset relationship, excellent sound-absorbent panels are obtained, because the materials contained in the holes or recesses are quasi suspended in the "foam skeleton" of the panels, and the sonic energy is converted to mechanical oscillations of the gypsum or cement plugs.

In FIGS. 5–41, 47, and 48, various alternate embodiments, constructions and configurations are provided for panels and blocks made in accordance with the present invention. Each of these Figures has been fully described above. For exemplary purposes only, and without intending to be limited thereby, these Figures depict foam members which are hollow in cross-section. However, as detailed above, solid core members may be employed, either exclusively or in combination, with equal efficacy.

In addition, in order to assure a full and complete understanding, the precise meaning or structural reference for each of the numerals employed in these Figures is provided in Table I.

TABLE I

| Numeral | Referenced Structure |
| --- | --- |
| 1 | foam tubes |
| 2, 2a, 2b, etc. | tube panels each formed from a series of foam tubes disposed side by side |
| 3, 3a | shorter panel edges of the foam panel |
| 4, 4a | longer panel edges of the foam panel |
| 5, 5a | panel edges on the sides formed by the open tube ends |
| 6, 6a | panel edges on the sides formed by the tube walls |
| 7, 7a | homogeneous or foamed film or sheet strips |
| 8, 8a | stepped edge |
| 9, 9a | round edge |
| 9', 9'a | round edge profile bar with spacer function on both sides |
| 9", 9"a | round edge profile bar with one-sided spacer function |
| 10, 10a | wedge-shaped |
| 11 | groove |
| 12 | tongue |
| 13 | triple round edge profile bar |
| 14 | laminated facing layers |
| 15 | foamed facing layers |

TABLE I-continued

| Numeral | Referenced Structure |
| --- | --- |
| 16 | foamed interlayer |
| 17 | foam tubules or rods as spacers |
| 18 | larger tubes as spacers |
| 19 | tubes with rib as spacers |
| 20 | drainage holes |

It will thus be seen that the objects set forth above, among those made apparent from the preceding description, are efficiently attained and, since certain changes may be made in the above article, as well as in carrying out the above processes, without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A panel comprising a plurality of independent, elongated members, each of said members
   A. consisting essentially of a synthetic resin foam material,
   B. being securely, interconnected to the elongated member positioned adjacent thereto, and
   C. having a substantially identical, solid cross-section throughout its overall length;
   whereby a resilient flexible, multi-purpose panel is attained in any desired configuration or appearance.

2. The panel defined in claim 1, wherein each of said elongated independent members is further defined as being substantially straight throughout its entire length.

3. The panel defined in claim 1, wherein each of said independent, elongated members is further defined as comprising a cross-sectional shape forming either a polygon or a closed curve.

4. The panel defined in claim 3, wherein said independent, elongated member is further defined as comprising at least one cross-sectional shape selected from the group consisting of circles, squares, ovals, rectangles, ellipses, and regular polygons.

5. The panel defined in claim 1, wherein said solid elongated independent members are positioned in a side by side relationship with the central axes of said members being substantially parallel to each other and lying in substantially a single plane.

6. The panel in claim 1, wherein a plurality of the elongated, independent members are further defined as
   A. incorporating an elongated bore axially extending the entire length thereof, forming a plurality of independent, elongated members each having a hollow cross-sectional shape, and
   being positioned in an alternating pattern with said solid elongated members, with all of the elongated members being aligned in a side by side pattern, with the central axes thereof parallel to each other and lying in substantially a single plane.

7. The panel defined in claim 6, wherein said hollow elongated members are further defined as comprising an overall cross-sectional shape which is substantially identical to the cross-sectional shape of the hollow portion.

8. A block comprising a plurality of panels as defined in claim 1, wherein said panels are stacked in a vertically aligned overlying relationship with each other, with the central axis of each of said elongated members being aligned both vertically and horizontally, and with the outer peripheral surfaces of each of said elongated members being glued or welded to the outer peripheral surfaces of the adjacent elongated members of the adjacent panels, whereby a block of any desired size, shape or configuration is attained by securely gluing or welding a plurality of panels to each other in the desired stacked array.

9. The block defined in claim 8, wherein the sides of said block are substantially flat and are formed by the terminating edges of the elongated members, all of which are aligned with each other in a substantially continuous plane.

10. The block defined in claim 9, wherein said elongated members are further defined as comprising a plurality of elongated solid members and elongated hollow members securely affixed to each other.

11. The block defined in claim 10, wherein said block is further defined as comprising a plurality of elongated hollow members arranged in an alternating pattern with said plurality of elongated solid members.

12. The panel defined in claim 1, wherein each of the elongated members are further defined as comprising a width which is not less than 0.5 inches.

13. The panel defined in claim 1, wherein each of said elongated members is further defined as comprising a width ranging between about 1 and 4 inches.

* * * * *